US012577886B1

(12) United States Patent
Schleif et al.

(10) Patent No.: US 12,577,886 B1
(45) Date of Patent: Mar. 17, 2026

(54) MOUNTING SYSTEM FOR HARDWARE ON STATIONARY STRUCTURE

(71) Applicant: GE Infrastructure Technology LLC, Greenville, SC (US)

(72) Inventors: Kurt Kramer Schleif, Greenville, SC (US); Jesse Michael Moss, Travelers Rest, SC (US); Charlotte Cole Wilson, Roebuck, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/969,648

(22) Filed: Dec. 5, 2024

(51) Int. Cl.
F01D 17/02 (2006.01)
G01D 11/30 (2006.01)

(52) U.S. Cl.
CPC ............. F01D 17/02 (2013.01); G01D 11/30 (2013.01)

(58) Field of Classification Search
CPC .......... F01D 17/02; F01D 17/04; F01D 17/06; F01D 17/08; F01D 17/085; G01D 11/30
See application file for complete search history.

(56) References Cited

U.S. PATENT DOCUMENTS

| | | | | | |
|---|---|---|---|---|---|
| 3,936,217 | A | * | 2/1976 | Travaglini | F01D 21/003 |
| | | | | | 415/118 |
| 4,907,456 | A | * | 3/1990 | Rozelle | G01H 1/006 |
| | | | | | 73/866.5 |

| | | | | | |
|---|---|---|---|---|---|
| 5,185,996 | A | * | 2/1993 | Smith | F01D 17/02 |
| | | | | | 415/118 |
| 7,153,023 | B2 | * | 12/2006 | Howard | G01K 1/14 |
| | | | | | 277/606 |
| 7,207,769 | B2 | * | 4/2007 | Tanioka | F01D 17/02 |
| | | | | | 415/118 |
| 8,764,289 | B2 | * | 7/2014 | Parsons | G01K 1/14 |
| | | | | | 73/866.5 |
| 9,778,144 | B2 | | 10/2017 | Schleif et al. | |
| 10,697,317 | B2 | * | 6/2020 | Bailey | F01D 25/24 |
| 12,286,886 | B2 | * | 4/2025 | Hartnagel | F01D 11/22 |

* cited by examiner

*Primary Examiner* — Christopher R Legendre
(74) *Attorney, Agent, or Firm* — Charlotte Wilson; James Pemrick; Hoffman Warnick LLC

(57) ABSTRACT

A system is provided for removably mounting hardware, like a probe, to a stationary structure, like a casing element of a turbine section. A receptacle element includes a base configured to be fixed to the stationary structure and a collar extending from the base. The collar includes an internal opening to receive the hardware and a locking element aperture. A locking element is movable in the locking element aperture between a locked position fixedly engaging the hardware and an unlocked position allowing the hardware to be removed. An attachment element is movable relative to the receptacle element and has a tapered portion to move the locking element into the locked position. A disk spring element is configured to force the attachment element relative to the receptacle element toward the locked position of the locking element, providing an intrinsic anti-rotation and anti-loosening feature.

27 Claims, 23 Drawing Sheets

MOUNTING SYSTEM FOR HARDWARE ON STATIONARY STRUCTURE

TECHNICAL FIELD

The disclosure relates generally to hardware mounting systems for industrial machines. More specifically, the disclosure relates to a mounting system for hardware, such an instrumentation probe, on stationary structure of an industrial machine, such as a casing element of a turbine section of a gas turbine system.

BACKGROUND

Industrial machines use a variety of removable hardware coupled to a stationary structure of the industrial machine. One example application is attaching instrumentation (sensor) probes to a casing element of a turbine section of a gas turbine system to measure, for example, characteristics of turbine rotor blade activity. Ideally, the hardware receptacle permits repeated installation and removal of the hardware without the use of complex threaded, welded or brazed arrangements.

One approach to mounting removable hardware uses distinct physical features present on the removable hardware that are complementary to physical features present in the receptacle on the stationary structure, allowing the hardware to be secured and released from the receptacle. One common quick-disconnect arrangement uses spherical balls that are forced/trapped, perhaps by a spring force, to engage a corresponding physical feature on the removable hardware, e.g., similar to grooves in a nozzle for an air hose or power washer wand. However, there are challenges with this arrangement that lead to undesirable results in some applications. For example, the removable hardware typically has some limited ability to move in, for example, the direction of its axis, i.e., it has some play. Additionally, the arrangement may have structures that can loosen during operation, reducing the grip on the removable hardware. In some applications, such as instrumentation probes, any movement or loosening of the removable hardware with respect to the receptacle may prevent accurate operation, e.g., laser measurements. Another challenge with this approach is it may not be applicable in situations where access to the receptacle or the removable hardware is limited.

Threaded connections are also a common approach to mounting removable hardware. However, a threaded connection can be problematic. For example, attaching instrumentation probes with threads thereon to a threaded opening of a casing of a turbine section of a gas turbine system can be very challenging because the probe is in a position where space is very limited and the line-of-sight is obstructed. Threading an instrumentation probe into a threaded probe receptacle can be especially difficult to do if the probe is very long. Further, any threaded connection requires alignment of threads, where there is a possibility of cross-threading. If cross-threading occurs in the probe receptacle, it may not be easily accessible for repair. Threaded connections can also back-out or loosen over time, causing structural issues and/or leaks. Moreover, with direct threaded connections between a probe and threaded receptacle, it is often difficult to precisely position the probe. An improved receptable for removably mounting instrument probes to a gas turbine casing would be useful in the industry.

BRIEF DESCRIPTION

All aspects, examples and features mentioned below can be combined in any technically possible way.

An aspect of the disclosure provides a system for removably mounting a hardware to a stationary structure, the system comprising: a receptacle element including a base configured to be fixed to the stationary structure and a collar extending from the base, the collar including an internal opening configured to slidingly receive the hardware and a locking element aperture in the collar open to the internal opening; a locking element movable in the locking element aperture between a locked position extending partially into the internal opening to fixedly engage the hardware and an unlocked position retracted from the internal opening and allowing the hardware to be removed from the internal opening; an attachment element axially movable relative to the receptacle element, the attachment element having a central opening defined therein through which the hardware extends and a tapered portion configured to move the locking element into the locked position based on a position of the attachment element relative to the receptacle element; and a disk spring element between the attachment element and the receptacle element, the disk spring element configured to force the attachment element relative to the receptacle element toward the locked position of the locking element.

Another aspect of the disclosure includes any of the preceding aspects, and the receptacle element includes a plurality of locking element apertures, and the locking element includes a locking element in each of the plurality of locking element apertures.

Another aspect of the disclosure includes any of the preceding aspects, and the locking element includes a sphere.

Another aspect of the disclosure includes any of the preceding aspects, and the disk spring element includes a plurality of stacked disk springs.

Another aspect of the disclosure includes any of the preceding aspects, and the attachment element and the receptacle element are threadedly coupled, wherein threaded advancement of the attachment element relative to the receptacle element overcomes a force of the disk spring element between the attachment element and the receptacle element, allowing the locking element to enter the unlocked position and the hardware to be removed.

Another aspect of the disclosure includes any of the preceding aspects, and further comprising a tool having a tubular body configured to receive the hardware therein, a first portion configured to non-rotatably engage the attachment element, and a second portion configured for rotating the tubular body to rotatably adjust the position of the attachment element relative to the receptacle element using the threaded coupling therebetween.

Another aspect of the disclosure includes any of the preceding aspects, and the attachment element and the receptacle element are slidingly coupled, wherein forced advancement of the attachment element relative to the receptacle element overcomes a force of the disk spring element between the attachment element and the receptacle element, allowing the locking element to enter the unlocked position and the hardware to be removed.

Another aspect of the disclosure includes any of the preceding aspects, and further comprising a tool having a tubular body configured to receive the hardware therein, a first portion configured to engage the attachment element, and a second portion accessible by a user to apply a force to slidingly advance the attachment element relative to the receptacle element to overcome a force of the disk spring element between the attachment element and the receptacle element, allowing the locking element to enter the unlocked position and the hardware to be removed.

Another aspect of the disclosure includes any of the preceding aspects, and the base of the receptacle element further includes: an end portion configured to couple to the stationary structure and from which the collar extends; an outer wall portion extending concentrically with the collar from the end portion to define a circular space therebetween configured to rotatably receive an end of the attachment element therein, and a plurality of cooling passages extending radially in the end portion and configured to deliver a coolant to a portion of the stationary structure enclosed by the receptacle element.

Another aspect of the disclosure includes any of the preceding aspects, and the locking element aperture includes a retention member preventing the locking element from fully entering the internal opening in the collar of the receptacle element.

Another aspect of the disclosure includes any of the preceding aspects, and further comprising a sealing element for sealing between the hardware and at least one of the attachment element and the receptacle element.

Another aspect of the disclosure includes any of the preceding aspects, and the hardware includes a probe, and the stationary structure includes a casing element of a turbine section of a gas turbine system.

Another aspect of the disclosure includes any of the preceding aspects, and the hardware includes an end having an end fitting coupled thereto, the end fitting including a retainer element configured to be engaged by the locking element.

Another aspect of the disclosure includes a system for removably mounting a probe to a casing element of a turbine section of a gas turbine system, the system comprising: a receptacle element including a base configured to be fixed to the casing element and a collar extending from the base, the collar including an internal opening configured to slidingly receive the probe and a locking element aperture in the collar open to the internal opening; a locking element movable in the locking element aperture between a locked position extending partially into the internal opening to fixedly engage the probe and an unlocked position retracted from the internal opening and allowing the probe to be removed from the internal opening; an attachment element axially movable relative to the receptacle element, the attachment element having a central opening defined therein through which the probe extends and a tapered portion configured to move the locking element into the locked position based on a position of the attachment element relative to the receptacle element; and a disk spring element between the attachment element and the receptacle element, the disk spring element configured to force the attachment element relative to the receptacle element toward the locked position of the locking element, wherein the locking element aperture includes a retention member preventing the locking element from fully entering the internal opening in the collar of the receptacle element.

Another aspect of the disclosure includes any of the preceding aspects, and the receptacle element includes a plurality of locking element apertures, and the locking element includes a locking element in each of the plurality of locking element apertures.

Another aspect of the disclosure includes any of the preceding aspects, and the locking element includes a sphere.

Another aspect of the disclosure includes any of the preceding aspects, and the disk spring element includes a plurality of stacked disk springs.

Another aspect of the disclosure includes any of the preceding aspects, and the attachment element and the receptacle element are threadedly coupled, wherein threaded advancement of the attachment element relative to the receptacle element overcomes a force of the disk spring element between the attachment element and the receptacle element, allowing the locking element to enter the unlocked position and the probe to be removed.

Another aspect of the disclosure includes any of the preceding aspects, and further comprising a tool having a tubular body configured to receive the probe therein, a first portion configured to non-rotatably engage the attachment element, and a second portion configured for rotating the tubular body to rotatably adjust the position of the attachment element relative to the receptacle element using the threaded coupling therebetween.

Another aspect of the disclosure includes any of the preceding aspects, and the attachment element and the receptacle element are slidingly coupled, wherein forced advancement of the attachment element relative to the receptacle element overcomes a force of the disk spring element between the attachment element and the receptacle element, allowing the locking element to enter the unlocked position and the probe to be removed.

Another aspect of the disclosure includes any of the preceding aspects, and further comprising a tool having a tubular body configured to receive the probe therein, a first portion configured to engage the attachment element, and a second portion accessible by a user to apply a force to slidingly advance the attachment element relative to the receptacle element to overcome a force of the disk spring element between the attachment element and the receptacle element, allowing the locking element to enter the unlocked position and the probe to be removed.

Another aspect of the disclosure includes any of the preceding aspects, and the base of the receptacle element further includes: an end portion configured to couple to the casing element and from which the collar extends; an outer wall portion extending concentrically with the collar from the end portion to define a circular space therebetween configured to rotatably receive an end of the attachment element therein; and a plurality of cooling passages extending radially in the end portion and configured to deliver a coolant to a portion of the casing element enclosed by the receptacle element.

Another aspect of the disclosure includes any of the preceding aspects, and further comprising a sealing element for sealing between the probe and at least one of the attachment element and the receptacle element.

Another aspect of the disclosure includes any of the preceding aspects, and the probe includes an end having an end fitting coupled thereto, the end fitting including a retainer element configured to be engaged by the locking element.

Another aspect of the disclosure includes a gas turbine (GT) system, comprising: a compressor section; a combustion section operatively coupled to the compressor section; a turbine section operatively coupled to the combustion section and including an outer casing element including a first opening, and an inner casing element surrounding rotating turbine blades and including a second opening in the outer casing element; and a probe positioned through the first opening and operatively mounted relative the second opening in the inner casing element by a mounting system, the probe including a retainer element in at least an outer surface thereof, the mounting system including: a receptacle element including a base configured to be fixed to the inner casing element and a collar extending from the base, the collar including an internal opening configured to slidingly receive the probe and a locking element aperture in the collar open to the internal opening; a locking element movable in the locking element aperture between a locked position extending partially into the internal opening to fixedly engage the retainer element of the probe and an unlocked position retracted from the internal opening and allowing the probe to be removed from the internal opening; an attachment element axially movable relative to the receptacle element, the attachment element having a central opening defined therein through which the probe extends and a tapered portion configured to move the locking element into the locked position based on a position of the attachment element relative to the receptacle element; and a disk spring element between the attachment element and the receptacle element, the disk spring element configured to force the attachment element relative to the receptacle element toward the locked position of the locking element.

Another aspect of the disclosure includes a system for removably mounting a probe to a casing element of a turbine section of a gas turbine system, the system comprising: a receptacle element including a base configured to be fixed to an innermost casing element of the turbine section and a collar extending from the base, the collar including an internal opening configured to slidingly receive the probe and a locking element aperture in the collar open to the internal opening; a locking element movable in the locking element aperture; an attachment element threadedly coupled to the receptacle element, the attachment element having a central opening defined therein through which the probe extends and a tapered portion configured to move the locking element relative to the locking element aperture based on a position of the attachment element relative to the receptacle element; and a disk spring element between the attachment element and the receptacle element, the disk spring element forcing the attachment element toward a locked position of the locking element relative to the receptacle element, wherein, in the locked position, the tapered portion of the attachment element engages the locking element to extend the locking element partially into the internal opening to lockingly engage a retainer element on the probe and prevent removal of the probe from the receptacle element, and rotation of the attachment element is resisted relative to the receptacle element by a force from the disk spring element between the attachment element and the receptacle element, and wherein, in an unlocked position of the locking element with the probe, the attachment element is threaded further onto the receptacle element against the force from the disk spring element, moving the tapered portion of the attachment element out of engagement with the locking element and allowing the probe to move the locking element out of the internal opening as the probe is removed from the internal opening of the receptacle element.

Another aspect of the disclosure includes any of the preceding aspects, and the probe includes an end having an end fitting coupled thereto, the end fitting including a retainer element configured to be engaged by the locking element.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
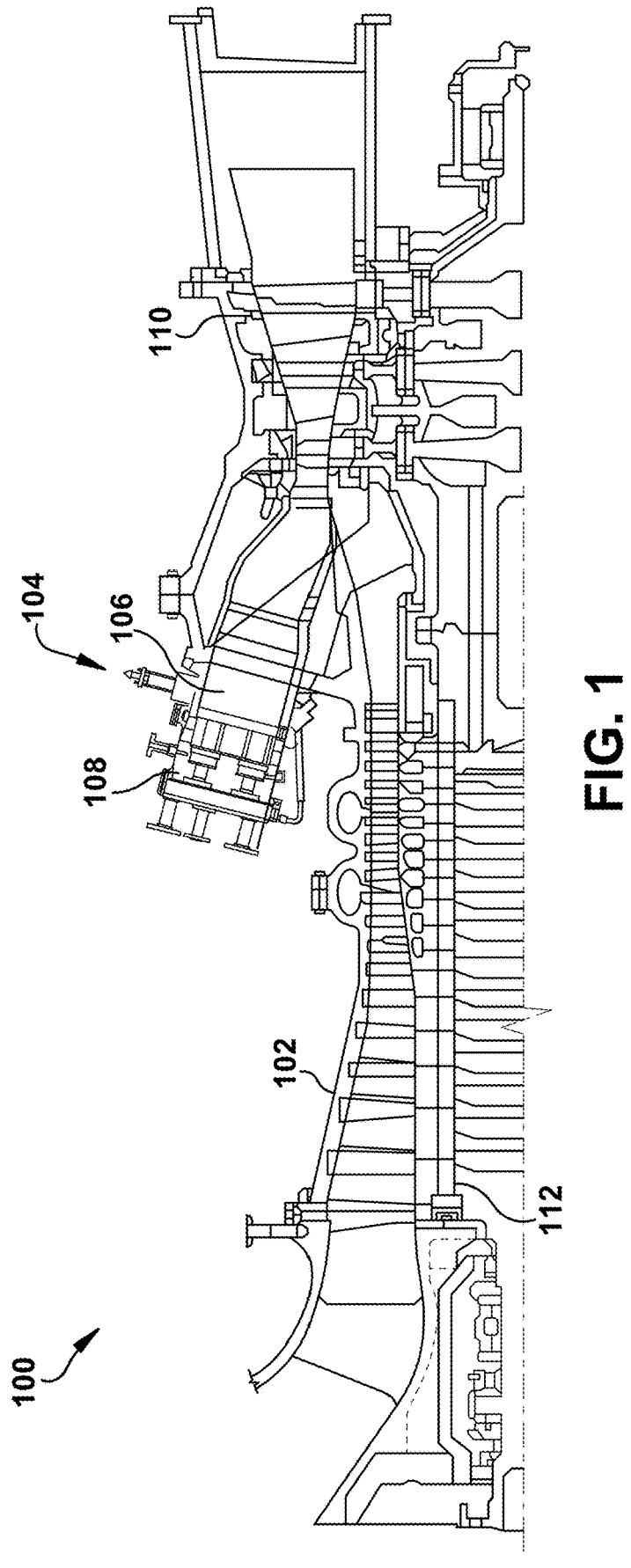
FIG. 1 shows a schematic view of an illustrative industrial machine in the form of a gas turbine (GT) system using a mounting system according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current technology, it will become necessary to select certain terminology when referring to and describing relevant machine components within the illustrative application of a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

It is often required to describe parts that are at different radial positions with regard to a center axis. The term "axial" refers to movement or position parallel to an axis, e.g., an axis of a turbomachine or an axis of a mounting system for a probe. The term "radial" refers to movement or position perpendicular to an axis, e.g., an axis of a turbomachine or probe. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a probe. As indicated above, it will be appreciated that such terms may be applied in relation to the axis of the turbomachine or probe.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure include a system for removably mounting hardware, such as an instrumentation probe, to a stationary structure, such as a casing element of a turbine section of a gas turbine system. The system includes a receptacle element including a base configured to be fixed to the stationary structure and a collar extending from the base. The collar includes an internal opening configured to slidingly receive the hardware and a locking element aperture in the collar open to the internal opening. A locking element is movable in the locking element aperture between a locked position extending partially into the internal opening to fixedly engage the hardware and an unlocked position retracted from the internal opening and allowing the hardware to be removed from the internal opening. An attachment element is axially movable relative to the receptacle element and has a central opening defined therein through which the hardware extends, and a tapered portion configured to move the locking element into the locked position based on a position of the attachment element relative to the receptacle element. A disk spring element is between the attachment element and the receptacle element and is configured to force the attachment element relative to the receptacle element toward the locked position of the locking element, providing an intrinsic anti-rotation and anti-loosening feature.

The system allows mounting of the hardware confidently knowing it is mounted securely and at the proper location and depth. Further, the system prevents any relative movement between the receptacle element and hardware during operation (i.e., there is no play), which, in the case of instrumentation probes, prevents inaccurate measurements from movement of the probe. The system also can be employed in challenging or tight-space positions or where line-of-sight to the mounting position is impossible (e.g., double-wall casing applications in a gas turbine system). While described herein relative to a probe for a casing element of a turbine section of a gas turbine system, the mounting system has a wide range of potential applications for all sorts of hardware other than probes, e.g., plugs and other hardware, mounted to any form of stationary structure.

FIG. 1 shows a schematic illustration of an industrial machine, which may use a mounting system 90 (FIG. 2) according to teachings of the disclosure. In the example, the industrial machine includes a gas turbine (GT) system 100. GT system 100 includes a compressor section 102 and a combustion section 104 operatively coupled to compressor section 102. Combustion section 104 includes a combustion region 106 and a fuel nozzle assembly 108. GT system 100 also includes a turbine section 110 (also known as an expansion turbine) operatively coupled to combustion section 104, and a common compressor/turbine shaft 112 (sometimes referred to as a rotor 112). GT system 100 may be any model commercially available from GE Vernova, Cambridge, MA, such as any HA, F, B, LM, GT, TM and E-class GT system models thereof, or GT system models of other companies. The present disclosure is not limited to any particular turbomachine, and may be applicable to, for example, steam turbines, jet engines, compressors, turbofans, etc. Further, as noted, the teachings of the disclosure may be applicable to a wide variety of industrial machines other than turbomachines.

In operation of GT system 100, air flows through compressor section 102, and compressed air is supplied to combustion section 104. Specifically, the compressed air is supplied to fuel nozzle assembly 108 that is integral to combustion section 104. Assembly 108 is in flow communication with combustion region 106. Fuel nozzle assembly 108 is also in flow communication with a fuel source (not shown in FIG. 1) and channels fuel and air to combustion region 106. Combustion section 104 ignites and combusts fuel. Combustion section 104 is in flow communication with turbine section 110 in which gas stream thermal energy is converted to mechanical rotational energy. Turbine section 110 rotatably couples to and drives rotor 112. Compressor section 102 also is rotatably coupled to rotor 112. In the illustrative embodiment, there is a plurality of combustors and fuel nozzle assemblies 108 in combustion section 106.

Figure 2:
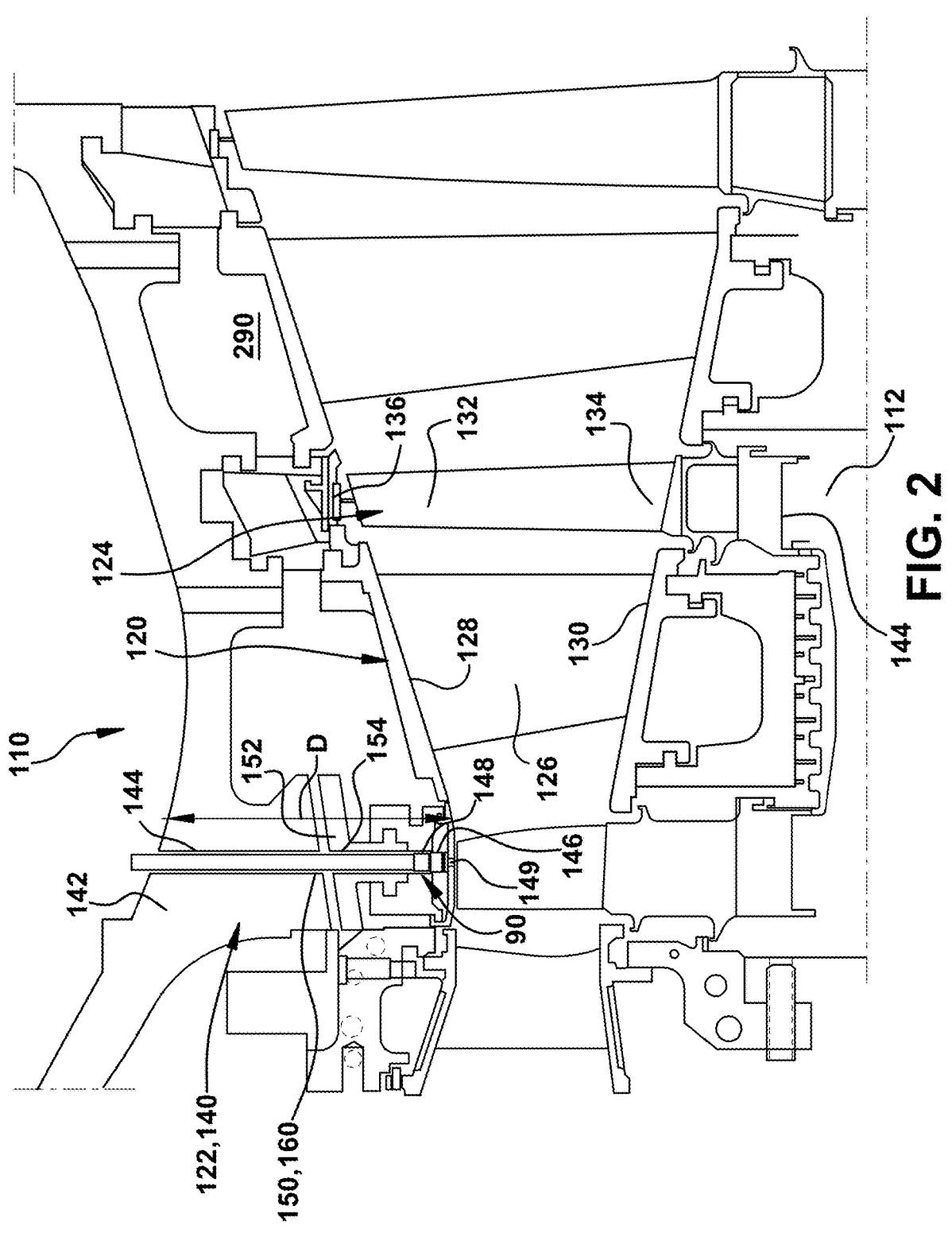
FIG. 2 shows a cross-sectional view of an illustrative turbine section of the GT system of FIG. 1 including a mounting system according to embodiments of the disclosure.

FIG. 2 shows a cross-sectional view of part of an illustrative turbine section 110 of GT system 100 (FIG. 1) using mounting system 90 according to embodiments of the disclosure. Turbine section 110 includes a row of nozzle or vanes 120 coupled to a stationary casing 122 of GT system 100 and axially adjacent a row of rotating blades 124. A nozzle or vane 126 may be held in turbine section 110 by a radially outer platform 128 and a radially inner platform 130. Row of blades 124 in turbine section 110 includes rotating blades 132 coupled to rotor 112 and rotating with the rotor. Rotating blades 132 may include a radially inward platform 134 (at root of blade) coupled to rotor 112 and, optionally, may include a radially outward tip shroud 136 (at tip of blade).

Stationary casing 122 of turbine section 110 represents an example of a stationary structure 140 according to embodiments of the disclosure. Stationary casing 122 and, hence, turbine section 110 may include a number of casing elements 142, 146 that can take a variety of forms. In the example shown, turbine section 110 includes an outer casing element 142 including a first opening 144 and an inner casing element 146 (actually a number of elements 146 in an annular arrangement) surrounding rotating blades 132. Inner casing element 146 includes a second opening 148 therein through which hardware 150 passes, and an access opening 149 to access rotating blades 132.

In the example shown, system 90 mounts hardware 150 on inner casing element 146 for access to rotating blades 132 using access opening 149. Inner casing element 146 may include a part of stationary casing 122 or a turbine shroud. A turbine shroud is a replaceable component positioned radially outside of rotating blades 132 and mounted in other parts of stationary casing 122 adjacent the blades. Stationary casing 122 may also include, in some cases, an intermediate casing element 152 between inner and outer casing elements 142, 146. Intermediate casing element 152 may include a third opening 154 through which hardware 150 extends. Hardware 150 may be mounted in or through first opening 144 in outer casing element 142 and second opening 148 in inner casing element 146 and, possibly, third opening 154 in intermediate casing element 152, where provided. Hardware 150 may access the space within inner casing element 146 through access opening 149 in inner casing element 146.

In the example shown in FIG. 2, hardware 150 may include any form of an instrumentation probe 160. Hence, hardware 150 includes probe 160, and stationary structure 140 includes inner casing element 146 of turbine section 110 of gas turbine system 100 (FIG. 1). In a non-comprehensive list, instrumentation probe 160 (hereafter "probe 160") may include any now known or later developed data-gathering device or part of a data-gathering device such as, but not limited to: optical sensor(s) (e.g., laser, visible light, infrared, waveguide, etc.), electrical sensor(s) (e.g., capacitance, impedance, etc.), pressure sensor(s) (e.g., transducer, pressure tube, etc.), and/or temperature sensor(s) (e.g., thermocouple). Probe 160 will be illustrated herein as cylindrical in shape, but other shapes are also possible. In one non-limiting example, probe 160 has a diameter in a range of 0.64-1.27 centimeters (~0.25-0.5 inches).

It will be recognized that "hardware" 150 can mean any of a very large variety of other devices, for example, tools, machinery, sensors or other durable equipment (not a probe 160) for mounting to stationary structure 140 (other than inner casing element 146). Regardless of form, hardware 150 (probe 160) includes a retainer element 162 (FIG. 3) in at least an outer surface thereof that can be used to mount it relative to stationary structure 140 by system 90. As will be described herein, retainer element 162 is shaped and sized to receive and be held in position by a locking element 180 of system 90. To this end, retainer element 162 may include one or more features in, on or extending from probe 160 capable of receiving locking element(s) 180, such as, but not limited to, a circumferential groove or notch, a series of concave openings, a series of diametrically extending openings, a protrusion, or a combination thereof.

For purposes of further description, hardware 150 will be described as probe 160, and stationary structure 140 will be described as inner casing element 146. Again, it will be recognized that mounting system 90 according to embodiments of the disclosure has a large variety of other applications besides probe 160 mounted to inner casing element 146 of turbine section 110. Mounting probe 160 relative to inner casing element 146 can be challenging. Depending on the rigidity of probe 160, some of openings 144, 148, 154 in casing elements 142, 146, 152 may be aligned; however, this is not necessary where probe 160 has some ability to flex as it passes through the openings. In addition, as observed in FIG. 2, mounting probe 160 to inner casing element 146 for access through second opening 148 is challenging from outside of outer casing element 142. For example, probe 160 must successfully traverse a distance D between an outside of outer casing element 142 to an inside of inner casing element 146, which distance depends on the size of turbine section 110. In one non-limiting example, the distance D may be in a range of 25 to 60 centimeters (~10 to 24 inches). In addition, there is oftentimes no line-of-sight from outside outer casing element 142 to an inside of inner casing element 146 where probe 160 must be mounted, especially where an intermediate casing element 152 is present. Adding to the challenge of mounting probe 160, the openings 144, 154 in each casing element 142, 152, respectively, through which probe 160 must pass, and the space adjacent inner casing element 146 where it must be securely mounted, can be very small.

Figure 3:
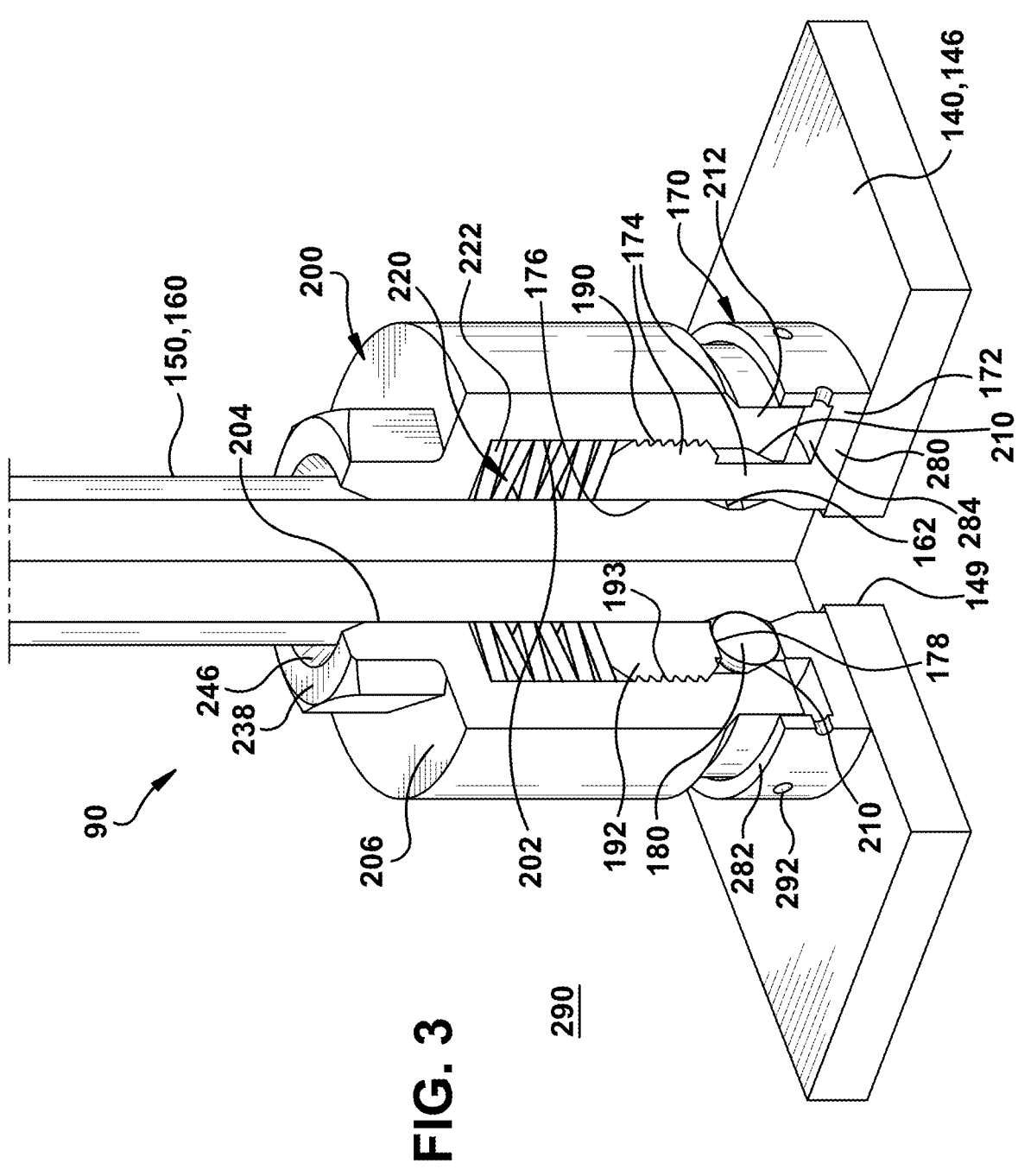
FIG. 3 shows a partial cross-sectional view of a mounting system in a locked position according to embodiments of the disclosure.
Figure 4:
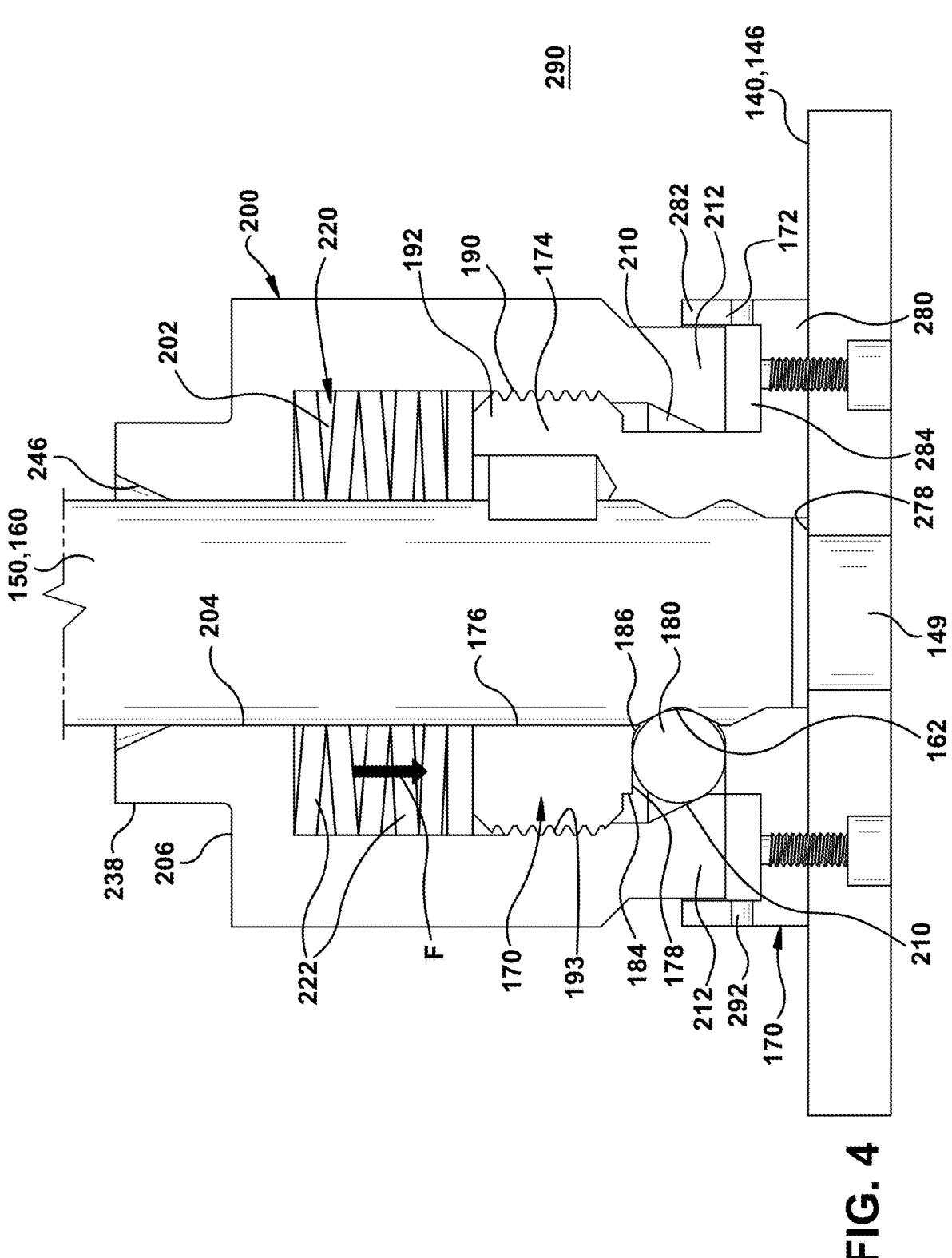
FIG. 4 shows a cross-sectional view of a mounting system in a locked position according to embodiments of the disclosure.

FIG. 3 shows a partial cross-sectional, perspective view and FIG. 4 shows a cross-sectional view of a mounting system 90 (hereafter "system 90") according to embodiments of the disclosure. As will be further described, FIGS. 3 and 4 show system 90 in a locked position that holds probe 160 securely to inner casing element 146. As noted, system 90 is for removably mounting hardware 150, e.g., probe 160, to stationary structure 140, e.g., inner casing element 146. System 90 includes a receptacle element 170 configured to couple to inner casing element 146. Receptacle element 170 includes a base 172 configured to be fixed to inner casing element 146, i.e., stationary structure 140, and a collar 174 extending from base 172. Collar 174 includes an internal opening 176 configured to slidingly receive probe 160, e.g., hardware 150, and a locking element aperture 178 in collar 174 open to internal opening 176. In the example shown, probe 160 and internal opening 176 both have circular cross-sections; however, other cross-sectional shapes are possible so long as probe 160 can slide within internal opening 176. Base 172 and collar 174 may be coupled in any manner now known or later developed, e.g., by fasteners (shown), welding, or integral manufacture (casting or additive manufacture, etc.). Base 172 may be coupled to inner casing element 146 in any now known or later developed fashion such as but not limited to threaded fasteners (shown), welding, brazing, or a combination thereof.

Figures 5, 6, 7:
FIG. 5 shows a side perspective view of a receptacle element of a mounting system according to embodiments of the disclosure.
FIG. 6 shows a bottom perspective view of a collar separated from a base of a receptacle element of a mounting system according to embodiments of the disclosure.
FIG. 7 shows a perspective view of a locking element of a mounting system according to other embodiments of the disclosure.

System 90 also includes a locking element 180 movable in locking element aperture 178. FIG. 5 shows a side perspective view of receptacle element 170, and FIG. 6 shows a bottom perspective view of collar 174 apart from base 172, according to embodiments of the disclosure. As shown in FIGS. 5 and 6, in certain embodiments, receptacle element 170 may include a plurality of locking element apertures 178. Where a plurality of locking element apertures 178 are used, a locking element 180 is positioned in each of the plurality of locking element apertures 178 (hereafter "apertures 178"). Apertures 178 may be circumferentially spaced about collar 174 in any desired manner, e.g., opposing or equidistantly spaced.

As will be described further herein, locking element(s) 180 is/are movable between a locked position (shown in, e.g., FIGS. 3, 4 and 19) extending partially into internal opening 176 to fixedly engage probe 160, i.e., hardware 150, and an unlocked position (shown in, e.g., FIGS. 11 and 13), retracted from internal opening 176 and allowing probe 160 to be removed from internal opening 176 of collar 174. Each locking element(s) 180 and aperture(s) 178 can take any variety of forms that allow locking element 180 to slidingly or rollingly move along a respective aperture 178 and partially into or out of internal opening 176 of collar 174. In FIG. 5, aperture 178 is mostly cylindrical, and locking element 180 is a sphere, e.g., a ball bearing. FIG. 7 shows a perspective view of a locking element 180 according to other embodiments. As shown in FIG. 7, with the same form of aperture 178 as in FIG. 5, locking element 180 could alternatively be a pin or cylinder with a rounded end 182 moving into and out of internal opening 176, i.e., slidingly longitudinally along aperture 178. In any case, as will be further described herein, aperture 178 and locking element 180 are shaped and sized such that locking element 180 may extend radially outward of an outer surface 184 of collar 174 for selective engagement with a tapered portion 210 of an attachment element 200.

Aperture(s) 178 are configured to allow locking element(s) 180 to only partially enter internal opening 176. To this end, aperture(s) 178 may include a retention member 186 preventing locking element(s) 180 from fully entering internal opening 176 in collar 174 of receptacle element 170. That is, retention member 186 blocks full movement of locking element 180 into internal opening 176. Retention member 186 can take any variety of forms such as, but not limited to, a narrower section of aperture 178 than the rest of aperture 178 or a separate element narrowing aperture 178. In FIGS. 3 and 5, for example, aperture 178 has retention member 186 in the form of a narrower section of aperture 178. That is, from the outer surface inward, aperture 178 has a first diameter, while, from the inner surface outward, retention member 186 has a second smaller diameter. Retention member 186 may be formed, for example, by using a rounded end boring tool to drill aperture(s) 178 into collar 174 of receptacle element 170. Alternatively, retention member 186 may be formed with receptacle element 170 through additive manufacturing. As will be recognized by those with skill in the art, other formation processes are also possible.

Figure 19:
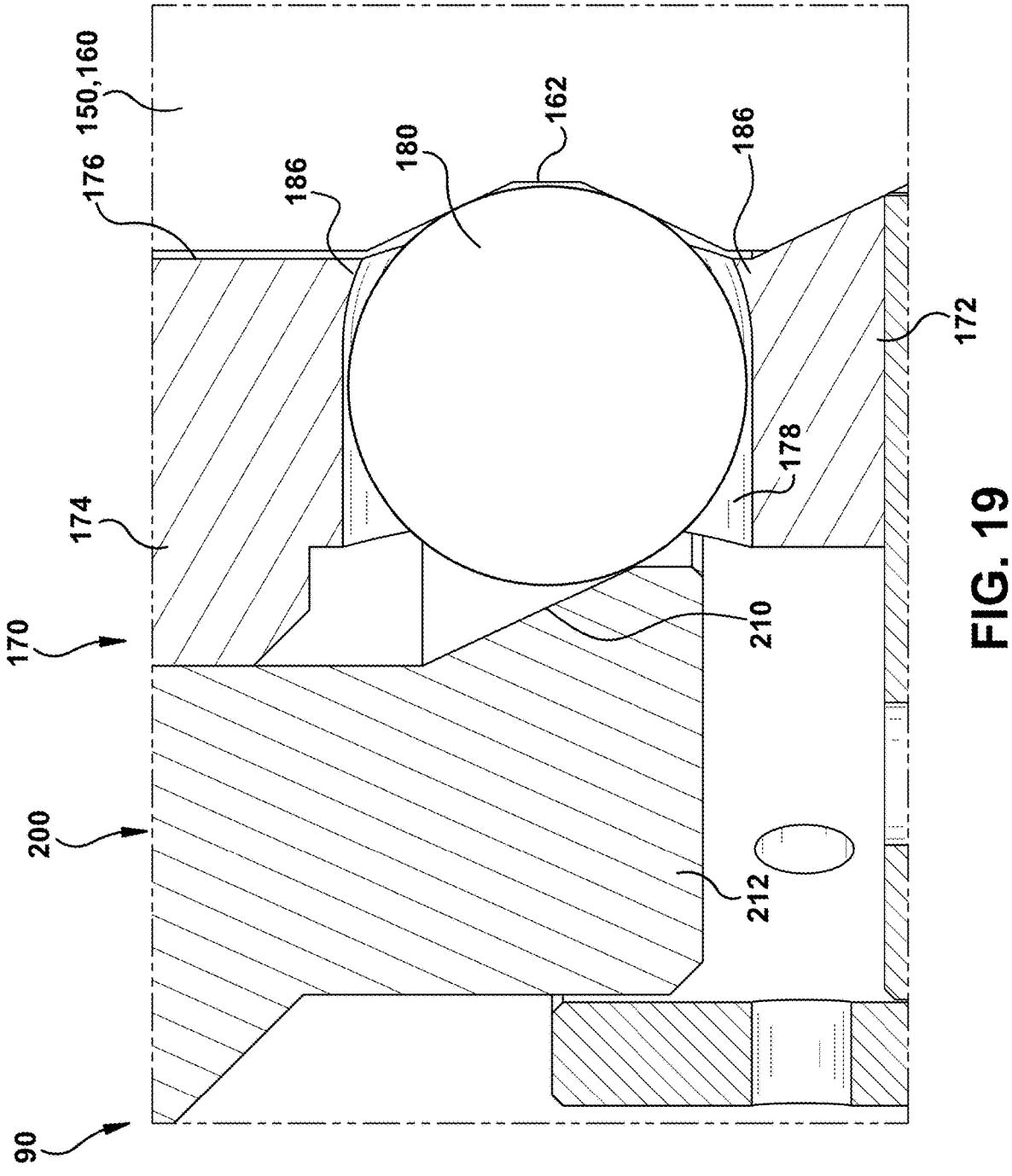
FIG. 19 shows an enlarged cross-sectional view of part of a mounting system in a locked position according to embodiments of the disclosure.

Referring to FIGS. 3 and 4, system 90 also includes an attachment element 200 axially movable relative to receptacle element 170. More particularly, attachment element 200 and receptacle element 170 mate such that they can selectively move longitudinally with respect to one another (up/down on page as shown). In certain embodiments, attachment element 200 generally has a cup shape having an open center 202 and a central opening 204 defined therein through which probe 160, i.e., hardware 150, extends. Central opening 204 is in a capped end 206 of attachment element 200. Attachment element 200 also includes a tapered portion 210. Tapered portion 210 is at an end 212 of attachment element 200 closest to base 172 of receptacle element 170, opposite capped end 206. As will be described further herein, tapered portion 210 is configured to move locking element 180 into the locked position, as shown in FIGS. 3, 4 and 19, based on a position of attachment element 200 relative to receptacle element 170. End 212 of attachment element 200 and/or tapered portion 210 also prevent locking element(s) 180 from exiting their respective aperture 178, e.g., radially outwardly, in the unlocked position (see e.g., FIG. 17).

In certain embodiments, as shown in FIGS. 3-6, collar 174 includes an outwardly threaded portion 192 at an end thereof opposite base 172, and attachment element 200 includes a mating, inwardly threaded portion 193, i.e., at an axial location thereof to threadedly mate with outwardly threaded portion 192. As will be described further herein, outwardly threaded portion 192 and inwardly threaded portion 193 allow receptacle element 170 and attachment element 200 to threadedly couple together.

Figure 8:
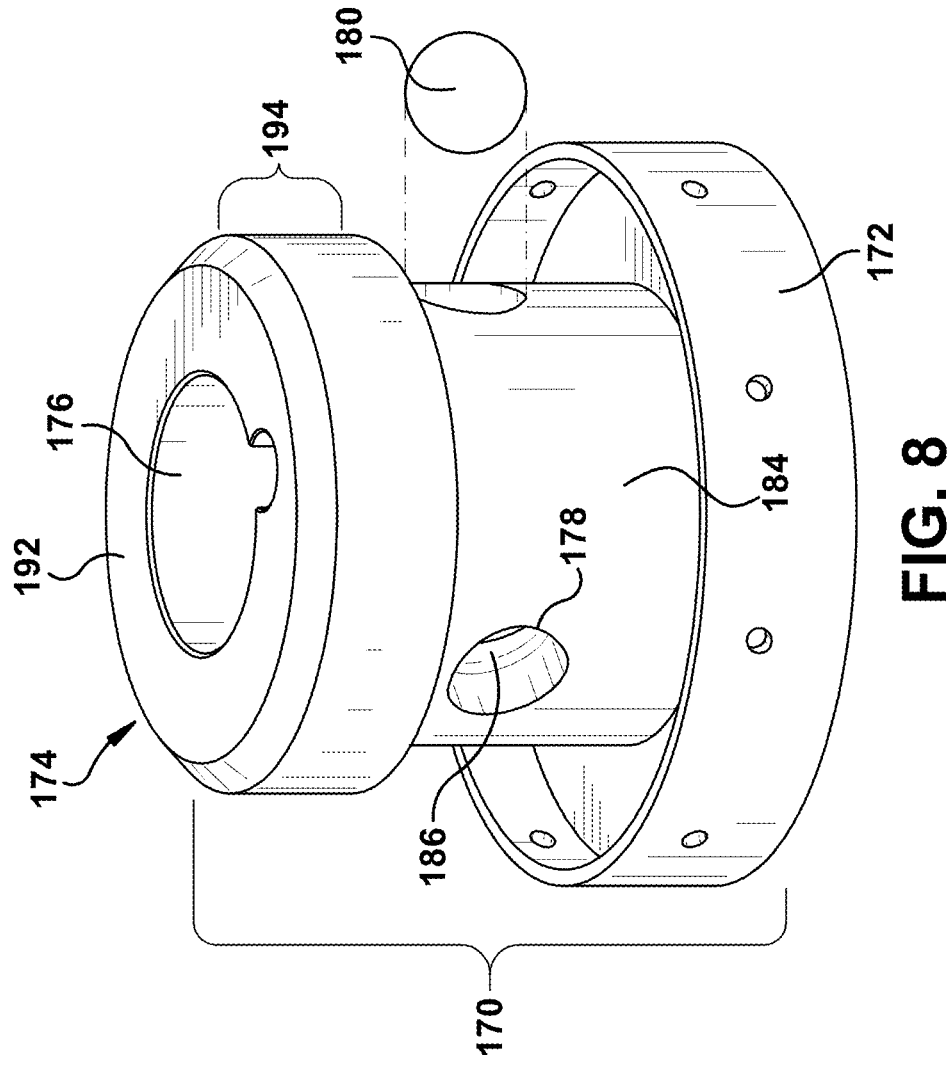
FIG. 8 shows a side perspective view of a receptacle element of a mounting system according to other embodiments of the disclosure.
Figure 9:
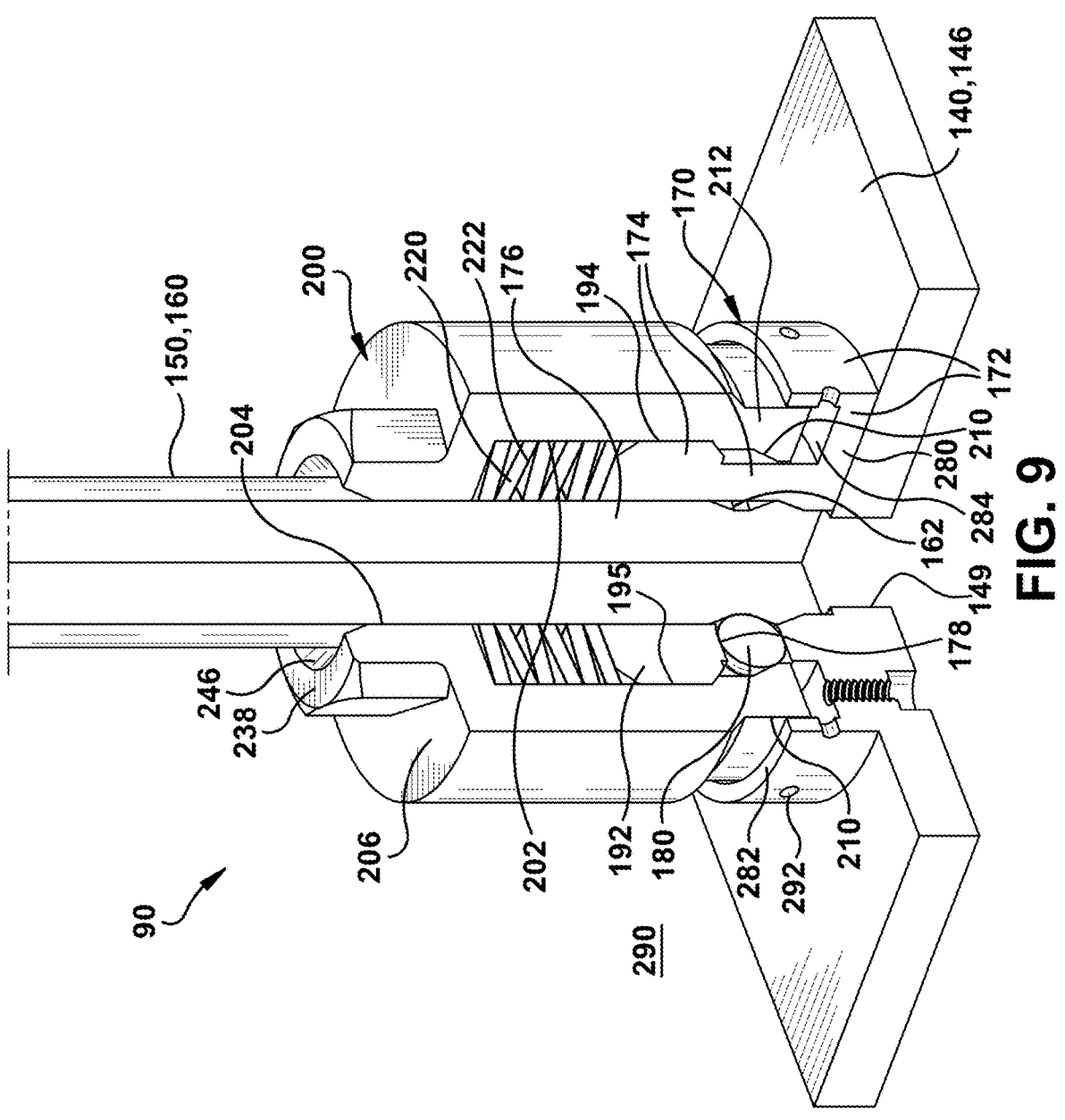
FIG. 9 shows a partial cross-sectional view of a mounting system in a locked position and including the receptacle element of FIG. 8, according to embodiments of the disclosure.
Figure 10:
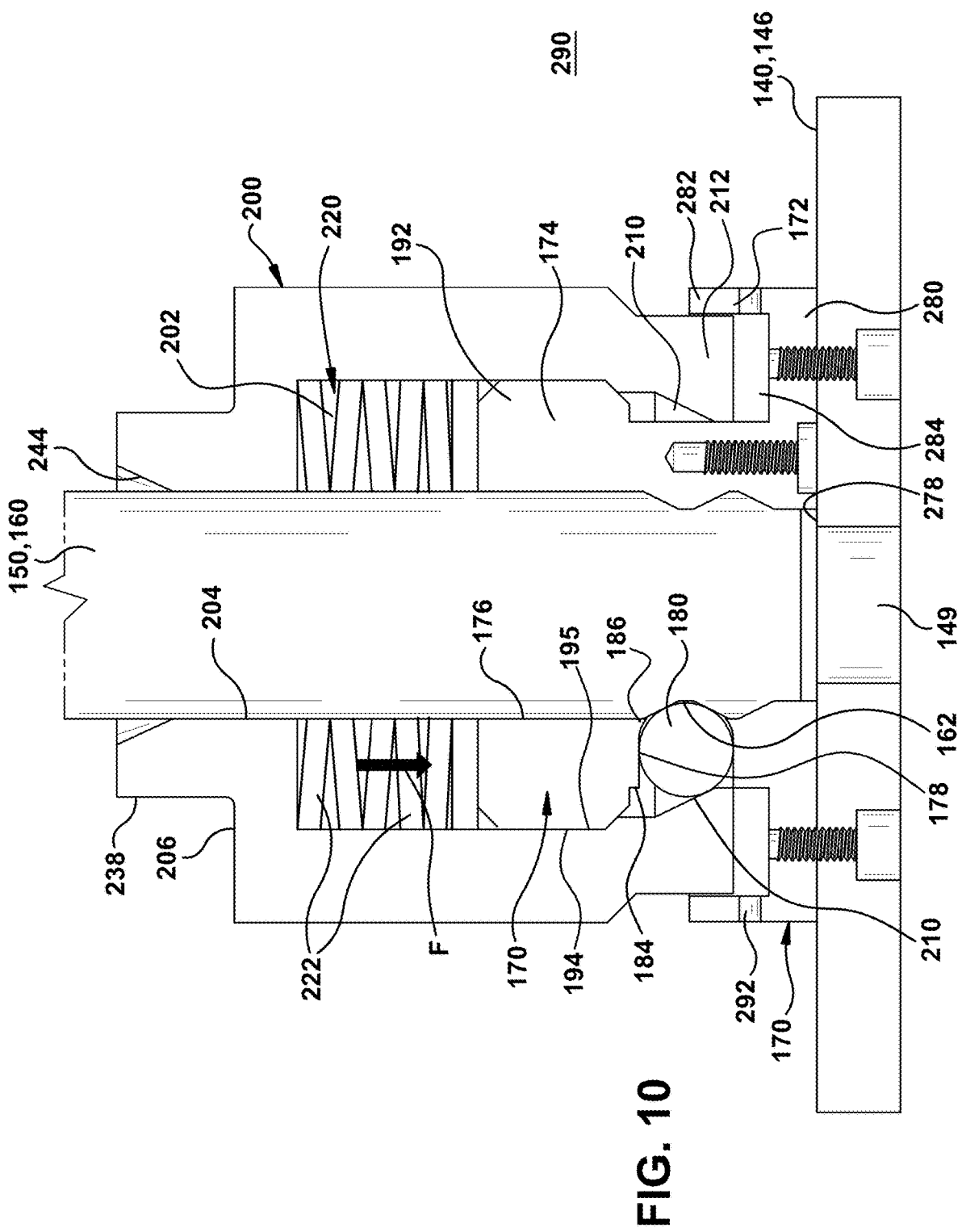
FIG. 10 shows a cross-sectional view of a mounting system in a locked position and including the receptacle element of FIG. 8, according to embodiments of the disclosure.

FIG. 8 shows a side perspective view of receptacle element 170, according to other embodiments of the disclosure; FIG. 9 shows a partially cross-sectional, perspective view; and FIG. 10 shows a cross-sectional view of system 90 according to other embodiments of the disclosure. In these alternative embodiments, the end of collar 174 opposite base 172 may have a smooth outer surface 194 on collar 174. Similarly, attachment element 200 has a smooth inner surface 195 in a location axially to mate with smooth outer surface 194 of receptacle element 170. As will be described further herein, and as shown in FIGS. 9-10, smooth (outer and inner) surfaces 194, 195 allow receptacle element 170 and attachment element 200 to slidingly couple.

As shown in FIGS. 3, 4, 9 and 10, system 90 also includes a disk spring element 220 between attachment element 200 and receptacle element 170. As will be described further herein, disk spring element 220 is configured to force attachment element 200 relative to receptacle element 170 toward a locked position of system 90 and with locking element 180 engaged with probe 160. Disk spring element 220 may include any now known or later developed structure capable of applying an expansion force F between attachment element 200 and receptacle element 170, i.e., pushing them apart. In certain embodiments, disk spring element 220 may include a plurality of stacked disk springs 222, also known as coned frustum disks or Belleville springs. As will be further described disk spring element 220 provides sufficient force F to resist movement of attachment element 200 toward receptacle element 170 in a direction toward an unlocking position of system 90.

Figure 11:
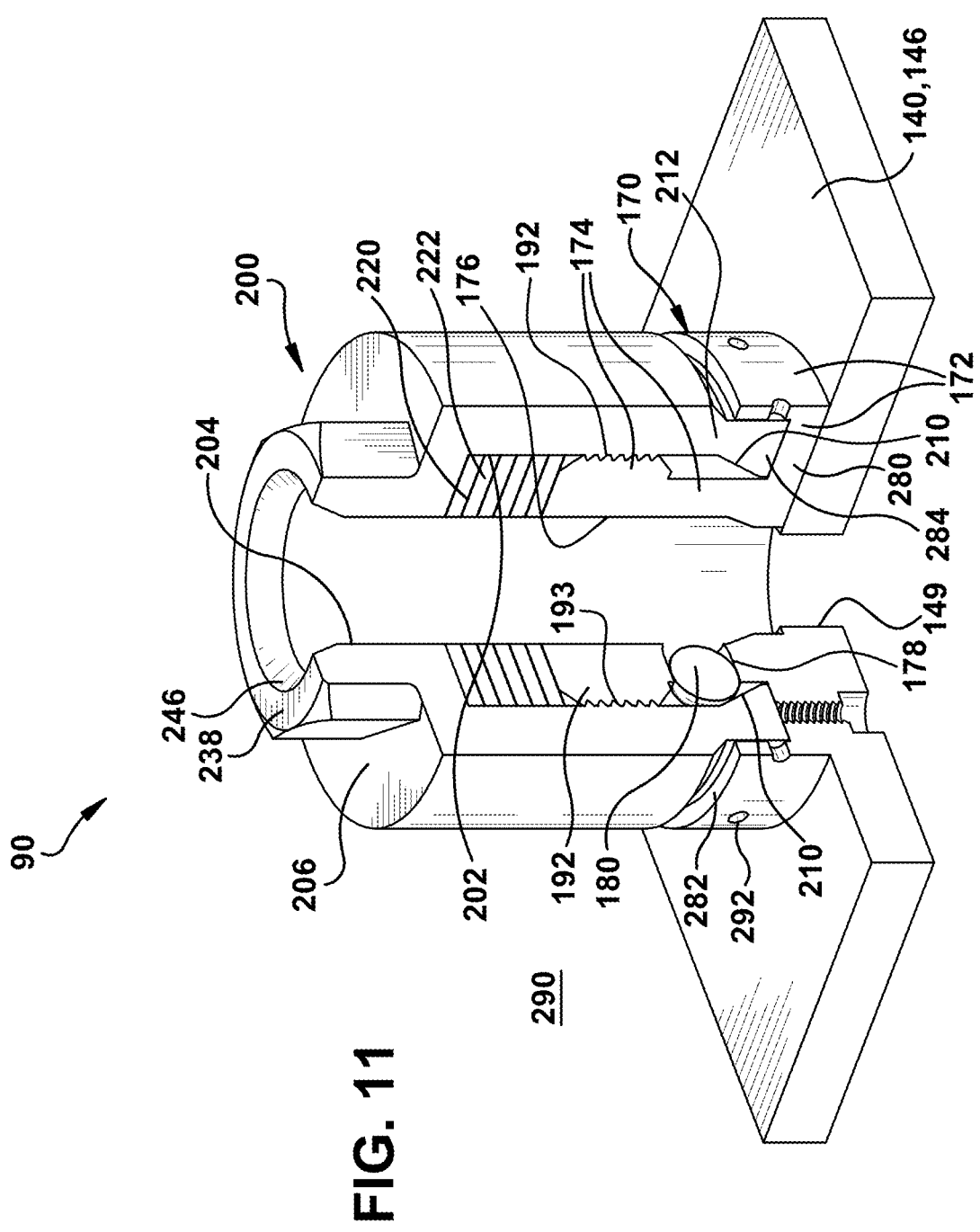
FIG. 11 shows a partial cross-sectional view of a mounting system in an unlocked position according to embodiments of the disclosure.
Figure 12:
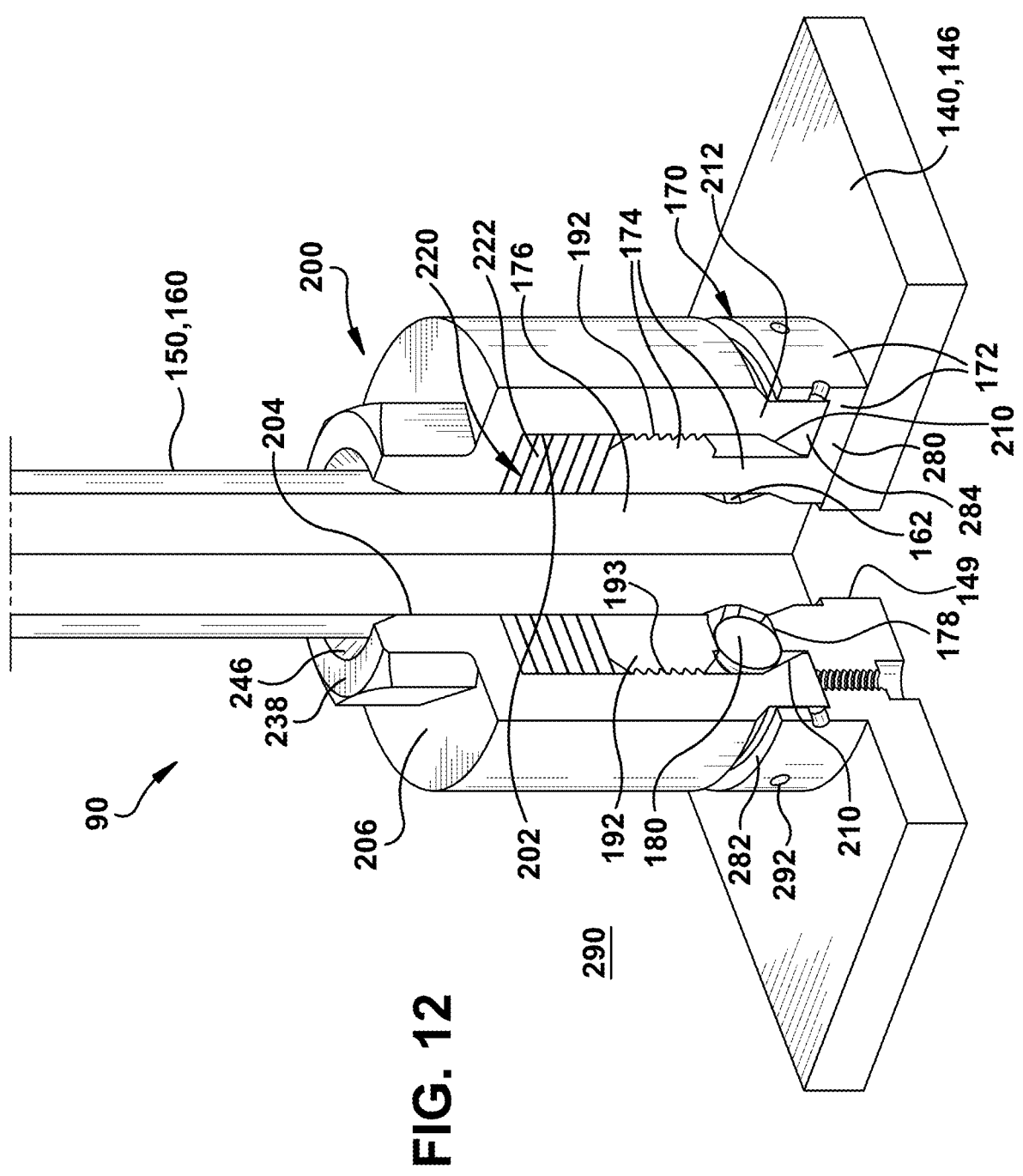
FIG. 12 shows a partial cross-sectional view of a mounting system in an unlocked position according to embodiments of the disclosure.
Figure 13:
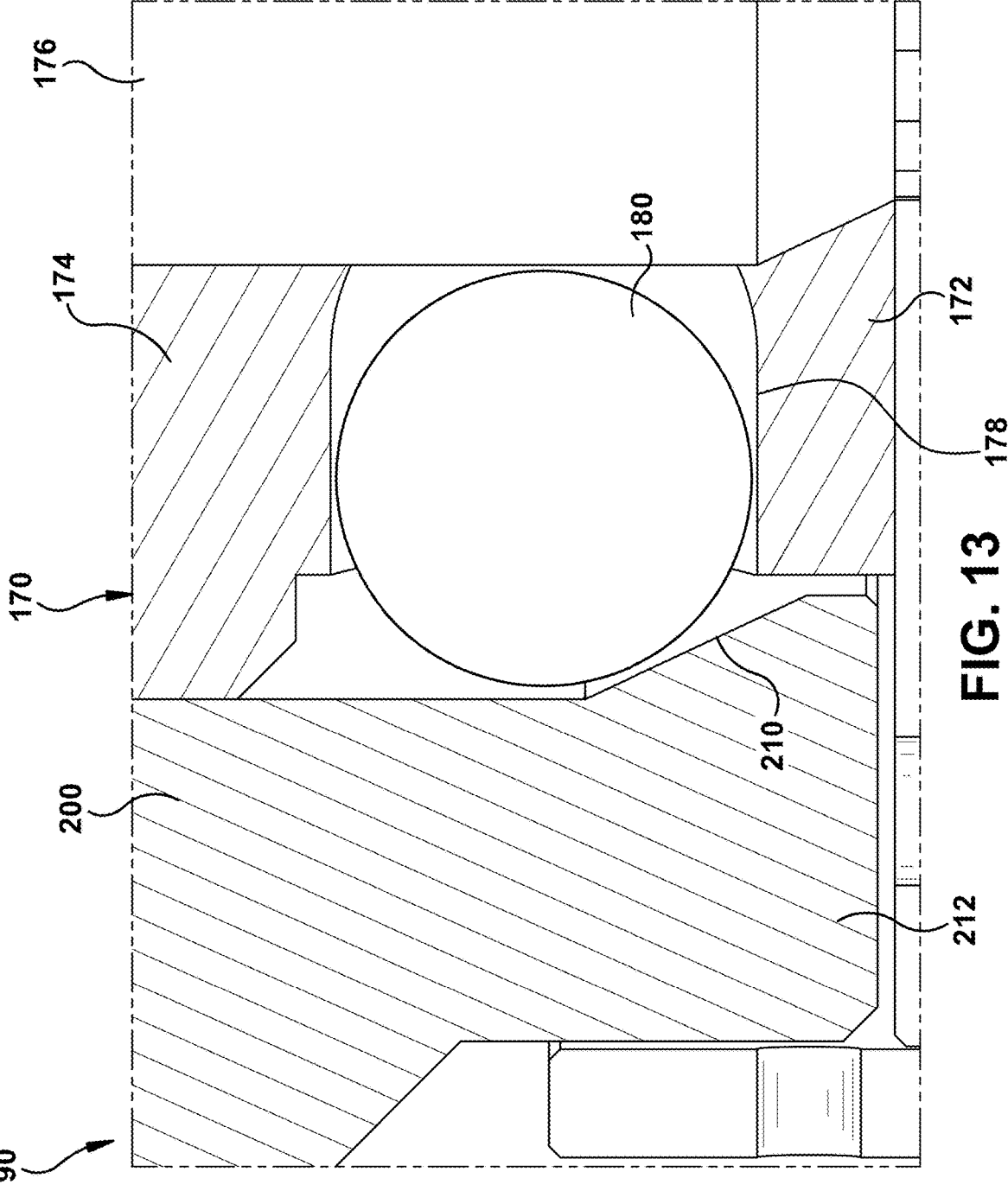
FIG. 13 shows an enlarged cross-sectional view of part of a mounting system in an unlocked position according to embodiments of the disclosure.
Figure 17:
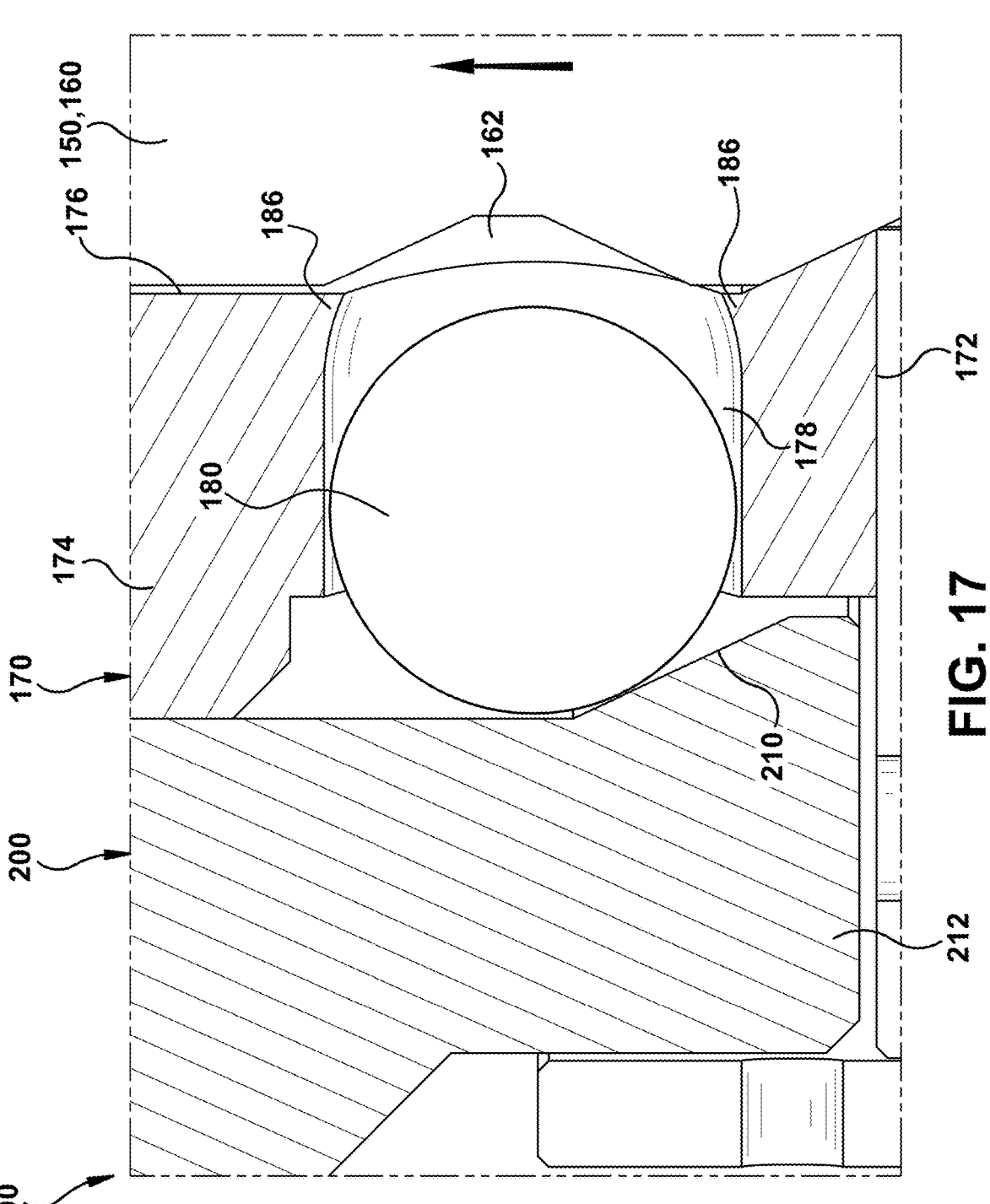
FIG. 17 shows an enlarged cross-sectional view of part of a mounting system in an unlocked position according to embodiments of the disclosure.

Operation of system 90 will now be described. FIGS. 3 and 4 show system 90 in a locked position, and FIGS. 11 and 12 show cross-sectional views of system 90, similar to FIG. 4, but with system 90 in an unlocked position. In FIG. 11, probe 160 is removed, and in FIG. 12, probe 160 is inserted into system 90, but not locked therein. To further describe operation of system 90, FIGS. 13, 17 and 19 show enlarged cross-sectional views of system 90 across locking element 180, and FIGS. 14, 18, 20 and 21 show schematic cross-sectional views of turbine section 110 where system 90 is used.

FIGS. 11-14 show system 90 in an unlocked position, ready to be used, and mounted on inner casing element 146 of turbine section 110. Base 172 of system 90 may be mounted, in a manner described herein, to inner casing element 146 during manufacture of turbine section 110, or during a repair thereof where inner casing element 146 is exposed. As shown in FIGS. 11 and 12, attachment element 200 and receptacle element 170 are threadedly coupled, and threaded advancement of attachment element 200 relative to receptacle element 170 has overcome force F of disk spring element 220 between attachment element 200 and receptacle element 170. Consequently, in this unlocked position, attachment element 200 is positioned relative to receptacle element 170 such that tapered portion 210 is not engaging locking element 180 or not engaging locking element 180 in manner to force locking element 180 into internal opening 176 of collar 174. That is, in an unlocked position of locking element(s) 180 with probe 160, attachment element 200 is threaded onto receptacle element 170 against force F from disk spring element 220, moving tapered portion 210 of attachment element 200 out of engagement with locking element(s) 180. The unlocked position also allows probe 160 to move locking element(s) 180 out of internal opening 176 as probe 160 is removed from internal opening 176 of receptacle element 170. As will be described, in this unlocked position, locking element 180 also allows entry of probe 160 into internal opening 176 and system 90.

Figure 14:
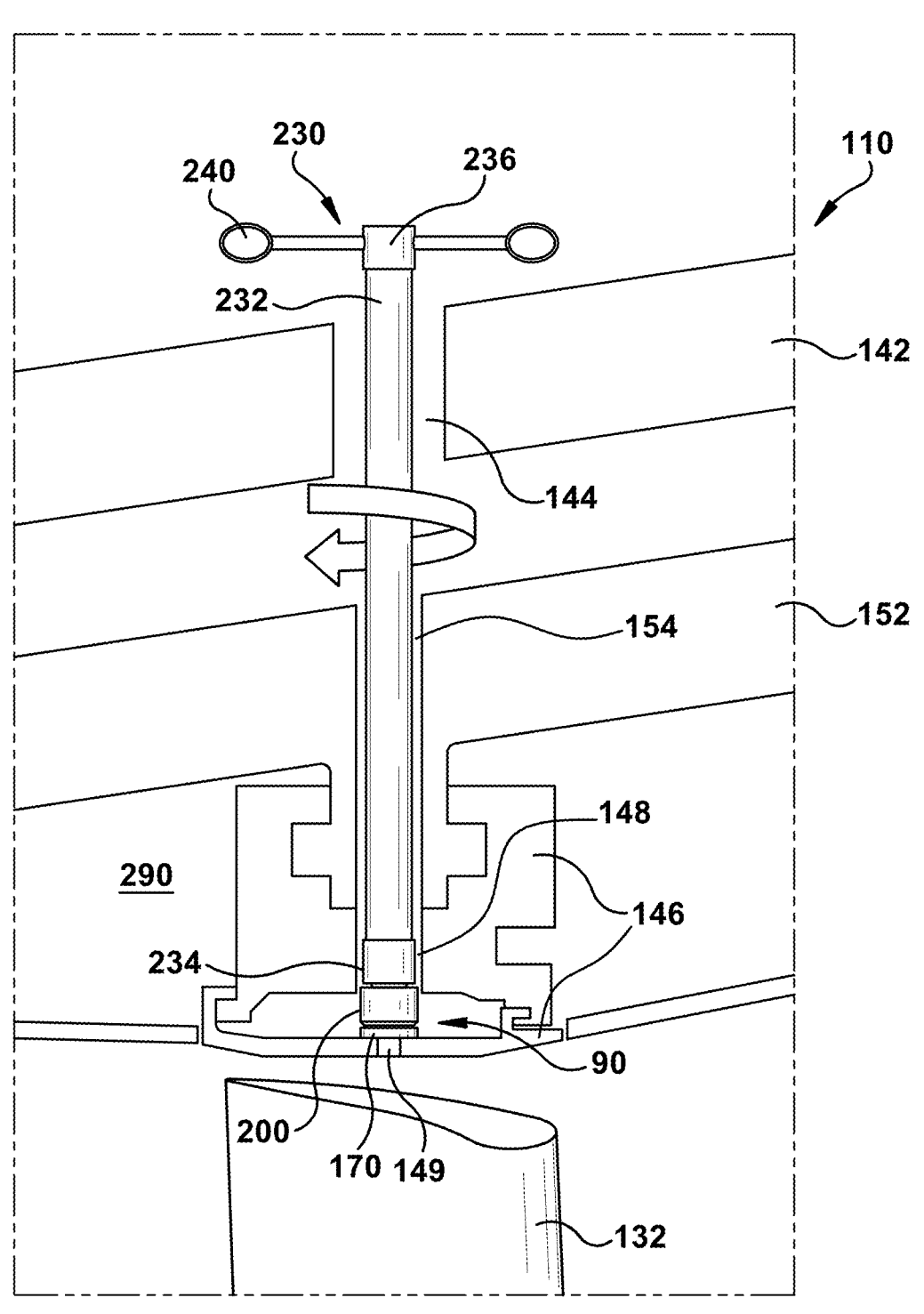
FIG. 14 shows a schematic cross-sectional view of a tool being used for unlocking a mounting system in a turbine section according to embodiments of the disclosure.
Figures 15, 16:
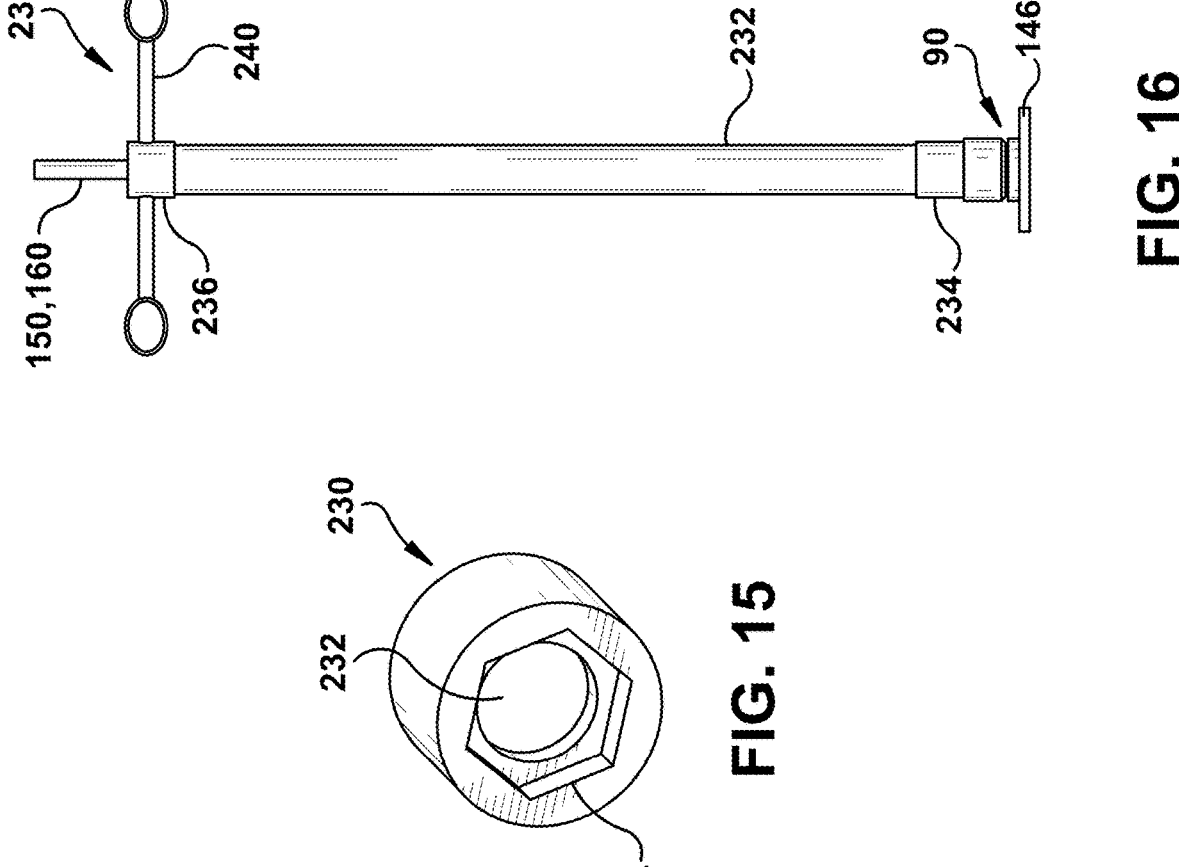
FIG. 15 shows an end view of a tool for a mounting system according to embodiments of the disclosure.
FIG. 16 shows a side view of a tool for a mounting system according to embodiments of the disclosure.

As shown in FIG. 14, system 90 can be placed in the unlocked position using a tool 230. FIG. 15 shows an end view of tool 230, and FIG. 16 shows a side view of tool 230. Tool 230 has a tubular body 232 configured to receive probe 160, i.e., hardware 150, therein. Tool 230 fits through any necessary openings, e.g., 144, 148, 154 (FIG. 14), to reach system 90 on inner casing element 146. Tool 230 also includes a first portion 234 configured to non-rotatably engage attachment element 200, and a second portion 236 configured for rotating tubular body 232 (see arrow in FIG. 14) to rotatably adjust the position of attachment element 200 relative to receptacle element 170 using the threaded coupling therebetween. More particularly, as shown in FIG. 3, attachment element 200 may include a tool-engageable end 238 that first portion 234 of tool 230 can matingly engage to rotate tubular body 232. While tool-engageable end 238 of attachment element 200 (on capped end 206 thereof) is shown as a hexagonal bolt-head, any form of tool-engageable structure can be used. Second portion 236 of tool 230 can include any manner of structure allowing rotation of tool 230 to rotate attachment element 200 and threadedly advance/retract it relative to receptacle element 170. In the example shown in FIG. 14, second portion 236 includes a handle 240 for manual rotation by a user, but second portion 236 could include any form of power tool attachment, e.g., for a power drill, to allow for powered rotation. It is emphasized that tool 230 is applicable to the example application of an elongated instrumentation probe 160 described herein, and tool 230 could take a variety of alternative forms depending on the different forms of hardware 150 to be mounted by system 90.

As noted, disk spring element 220 provides force F (FIG. 4) against rotation of attachment element 200 relative to receptacle element 170, which increases as disk spring element 220 is further compressed. In this manner, disk spring element 220 provides an anti-rotation function to system 90. In one non-limiting example, disk spring element 220 may initially require overcoming 880 Newtons (~200 pound-force) of axial resistance to start unlocking system 90 and may, eventually, provide up to 1800 Newtons (~400 pound-force) of axial resistance as attachment element 200 advances further toward base 172 of receptacle element 170.

Figure 18:
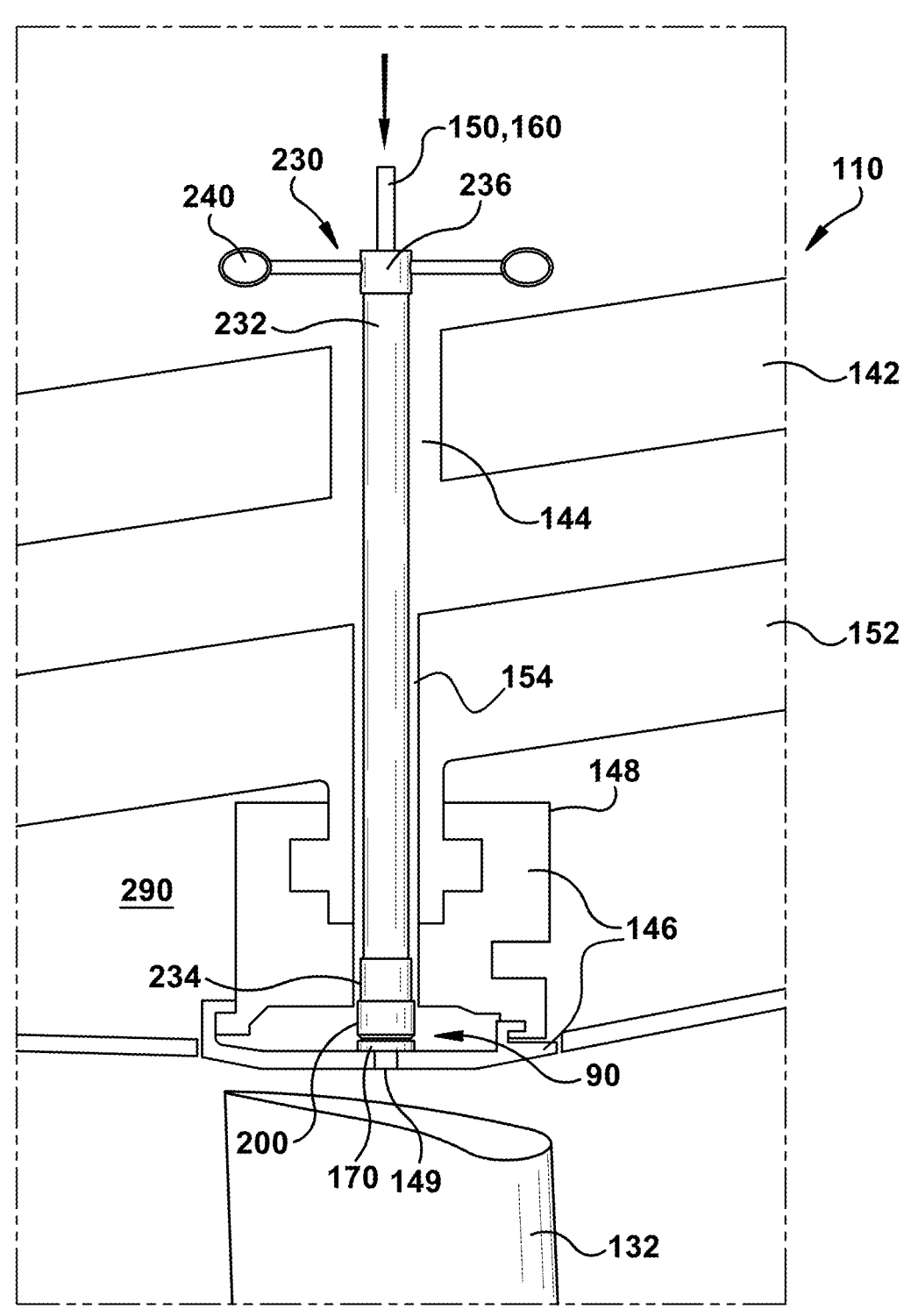
FIG. 18 shows a schematic cross-sectional view of using a tool for inserting hardware in an unlocked position of a mounting system in a turbine section according to embodiments of the disclosure.

FIGS. 12, 17 and 18 show system 90 after insertion of probe 160 through tool 230 and into receptacle element 170 of system 90, i.e., internal opening 176 in collar 174 of receptacle element 170. System 90, and notably, central opening 204 in attachment element 200, internal opening 176 in receptacle element 170 and tool 230 collectively act to direct probe 160 into position in system 90 to ensure proper location and seating. For example, for probe 160, the noted structure directs probe 160 into the desired position (as dictated by a user based on the positioning of system 90 on inner casing element 146) relative inner casing element 146, access opening 149 and rotating blades 132. In this manner, a user can confidently know probe 160 is positioned properly despite no line-of-sight from outside outer casing element 142 and tight spacing between outer casing element 142 and inner casing element 146. Attachment element 200 and/or receptacle element 170 can include any form of guiding surfaces, such as a tapered opening 246 (FIGS. 3-4) on capped end 206 of attachment element 200, to ensure probe 160 enters system 90 in a desired direction. As shown in FIGS. 3 and 4, internal opening 176 of receptacle element 170 can have an end in base 172 having any desired shape, size and/or location to position the end of probe 160 where desired relative to access opening 149 and inner casing element 146 for accurate operation. The shape and/or size of internal opening 176 and probe 160 are also configured to ensure probe 160 does not vibrate and does not have any play allowing it to move side-to-side and/or axially during use.

Figure 20:
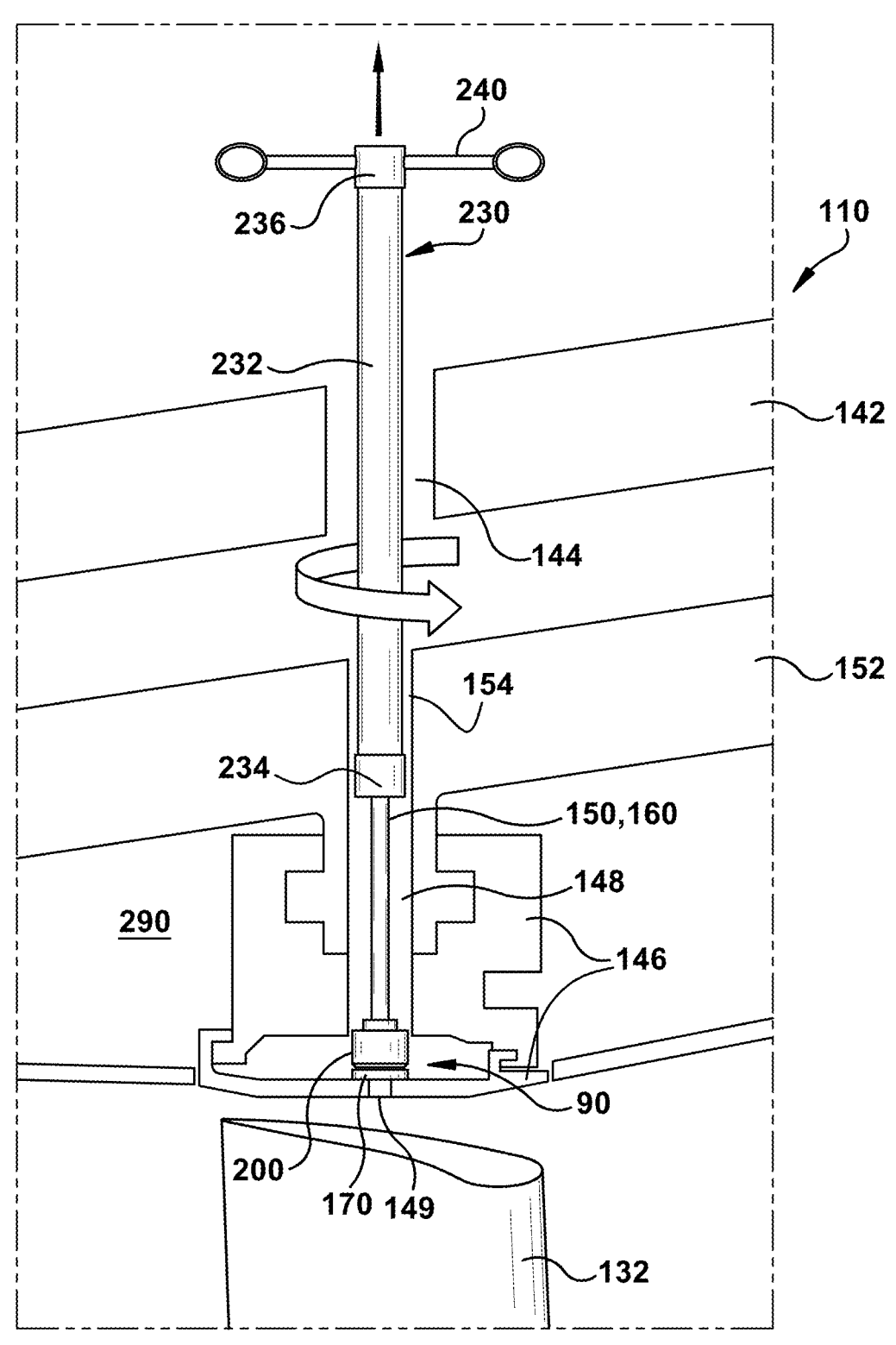
FIG. 20 shows a schematic cross-sectional view of removing a tool used in a mounting system in a turbine section according to embodiments of the disclosure.

FIGS. 3, 4, 19 and 20 show system 90 in a locked position. Here, as shown in FIGS. 3 and 4, attachment element 200 and receptacle element 170 are threadedly coupled, and attachment element 200 has been retracted relative to receptacle element 170 by rotation of attachment element 200 under the influence of force F of disk spring element 220 between attachment element 200 and receptacle element 170. As this occurs, tapered portion 210 of attachment element 200 engages locking element(s) 180 and forces it/them toward internal opening 176 of collar 174 where locking element(s) 180 fixedly engage retainer element(s) 162 of probe 160. That is, in the locked position as shown in FIG. 19, tapered portion 210 of attachment element 200 engages locking element(s) 180 to extend locking element(s) 180 partially into internal opening 176 to lockingly engage retainer element(s) 162 in probe 160, e.g., seat in retainer element 162 thereof, and prevent removal of probe 160 from receptacle element 170. In the locked position, rotation of attachment element 200 is resisted relative to receptacle element 170 by force F from disk spring element 220 between attachment element 200 and receptacle element 170. In order to move to the locked position, as shown in FIG. 20, tool 230 is rotated to retract attachment element 200 relative to receptacle element 170. A user will know the retraction of attachment element 200 relative to receptacle element 170 is complete as the rotation of tool 230 becomes impossible as tapered portion 210 engages locking element(s) 180 and prevents any additional retraction. Once retraction is complete, as shown in FIG. 20, tool 230 can be removed from over probe 160.

Figure 21:
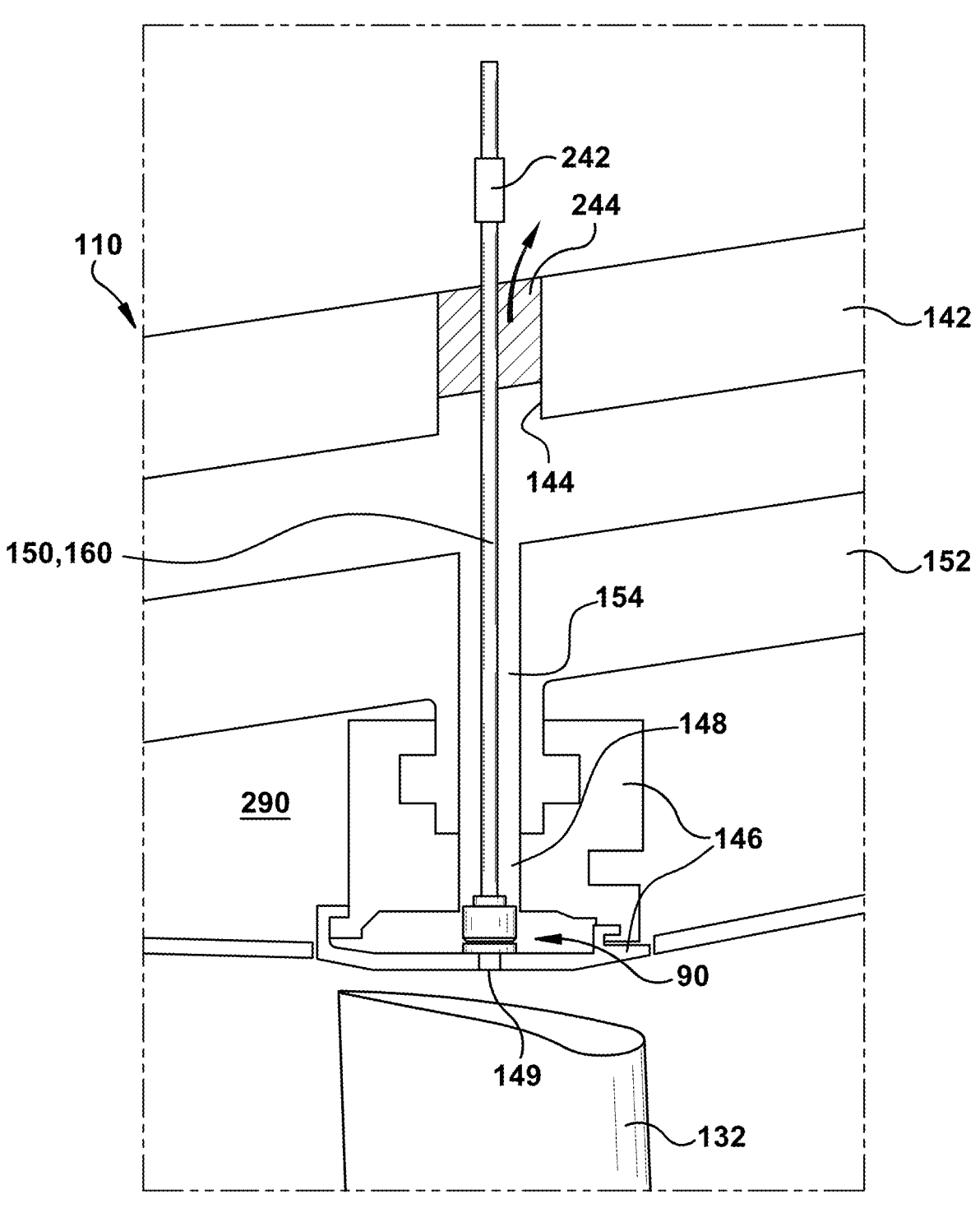
FIG. 21 shows a schematic cross-sectional view of a mounting system in an operative state in a turbine section according to embodiments of the disclosure.

FIG. 21 shows system 90 in an operative state of turbine section 110. At this stage, a communications line 242 can be coupled to probe 160, and first opening 144 in outer casing element 142 can be closed about probe 160 in any now known or later developed fashion, e.g., using a threadedly fastened or welded collar 244 about probe 160. In the locked, operative position, as shown in FIGS. 3, 4 and 19, attachment element 200 is positioned relative to receptacle element 170 such that tapered portion 210 engages locking element(s) 180 to force locking element 180 into internal opening 176 of collar 174. In the locked position, in the example locking element and retainer element example shown, locking element(s) 180 moves into retainer element 162 of probe 160. Locking element(s) 180 and retainer element 162 are shaped and sized to hold probe 160 in a firm, fixed position in the locked position. Internal opening 176 of receptacle element 170 may also be shaped and sized to provide the firm, fixed position for probe 160. The locked position ensures probe 160 does not vibrate and does not have any play allowing it to move side-to-side and/or axially during use, which ensures accurate measurements thereby. During operation, disk spring element 220 applies force F between attachment element 200 and receptacle element 170 that continually pushes the parts toward the locked position. Any unlikely loosening of system 90, e.g., from vibration or other operational forces, further retracts attachment element 200 relative to receptacle element 170, further tightening tapered portion 210 against locking element(s) 180 to hold probe 160 in place.

To remove probe 160, the described process is reversed. That is, as shown in FIG. 14, tool 230 is placed over probe 160 (after removal of any communications line 242 and collar 244 (FIG. 21)), engaging second portion 236 (FIGS. 15-16) thereof with tool-engaging end 238 (FIG. 3, 4). Rotating of tool 230 advances attachment element 200 relative to receptacle element 170 against force F (FIG. 11) and, as shown in FIG. 13, moves tapered portion 210 of attachment element 200 out of engagement with locking element(s) 180. In this unlocked position, probe 160 can be easily removed, with retainer element(s) 162 easily pushing locking element(s) 180 out of internal opening 176 of collar 174 and along or into apertures(s) 178 in collar 174 of receptacle element 170.

Returning to FIGS. 8-10, in an alternative embodiment, attachment element 200 and receptacle element 170 are not threadedly coupled but are slidingly coupled. That is, thread portions 190, 193 (FIGS. 3-6) are replaced by sliding smooth surfaces 194, 195 (FIGS. 8-10). In this setting, forced linear advancement of attachment element 200 relative to receptacle element 170 overcomes force F of disk spring element 220 between attachment element 200 and receptacle element 170, allowing (as shown in FIG. 13) locking element(s) 180 to enter the unlocked position and removal of probe 160. The linear (not rotational) force applied to attachment element 200 to move system 90 to the unlocked position in this sliding arrangement can be applied in a number of ways, which will be described relative to FIGS. 22-24.

Figures 22, 23:
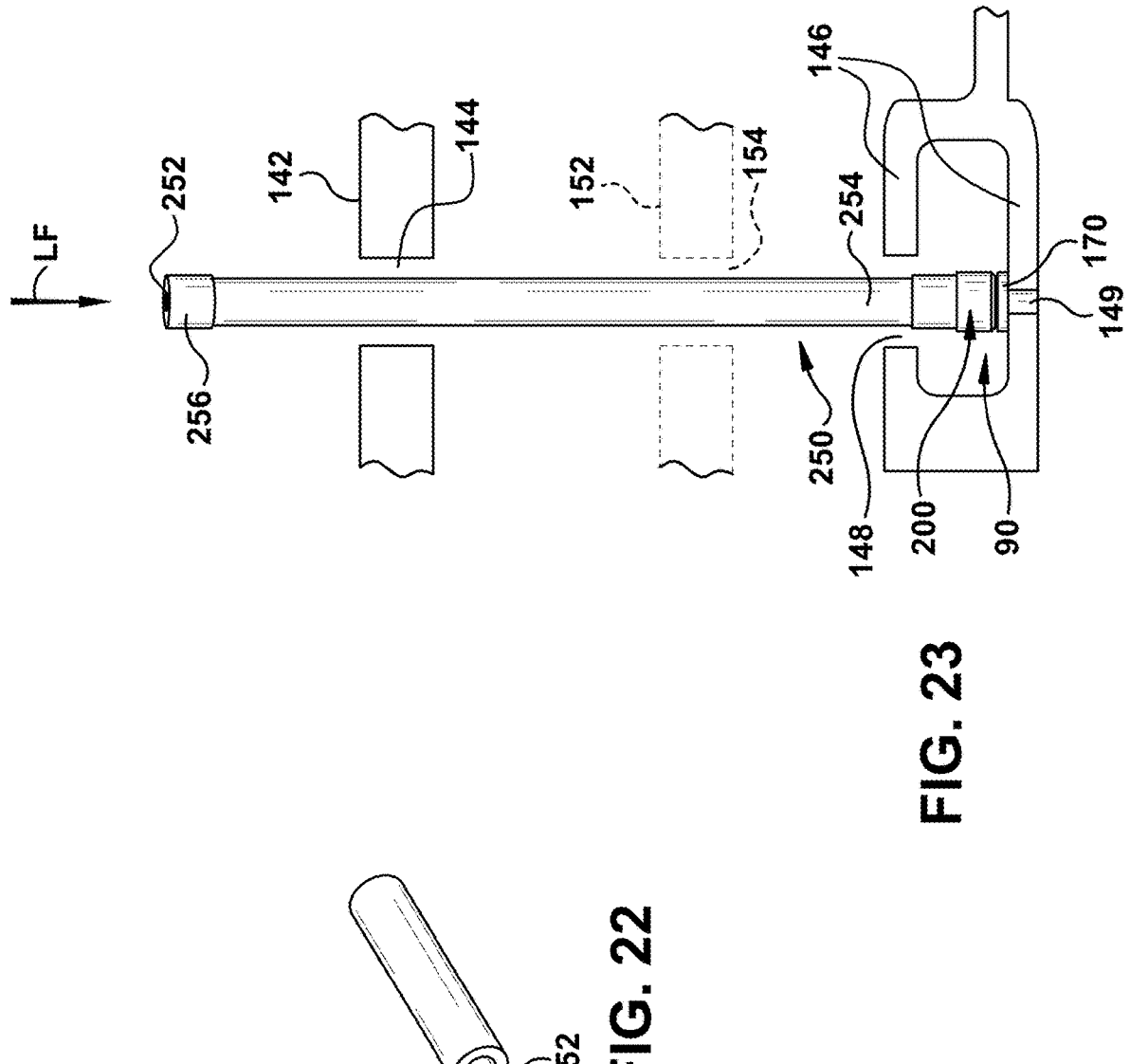
FIG. 22 shows a side view of a tool for a mounting system according to other embodiments of the disclosure.
FIG. 23 shows a side view of a tool for a mounting system according to other embodiments of the disclosure.

FIG. 22 shows an end view of a tool 250 on system 90, and FIG. 23 shows a side view of tool 250 for linearly forcing attachment element 200 relative to receptacle element 170 where they are in a sliding arrangement, according to embodiments of the disclosure. Tool 250 has a tubular body 252 configured to receive probe 160, i.e., hardware 150, therein. Similar to tool 230 in FIG. 14, tool 250 fits through any necessary openings, e.g., 144, 148, 154, to reach system 90 on inner casing element 146. Tool 250 also includes a first portion 254 configured to engage attachment element 200, and a second portion 256 (accessible by a user through outer casing element 142 like tool 230 in FIG. 14) to apply a linear force LF to slidingly advance attachment element 200 relative to receptacle element 170. Linear force LF overcomes force F of disk spring element 220 between attachment element 200 and receptacle element 170, allowing locking element(s) 180 to enter the unlocked position and removal of hardware 150, e.g., probe 160. That is, with reference to FIGS. 8-10, 22 and 23, tool 250 is configured to receive a linear force LF (e.g., directly from a user or other force applying tool) and apply it along tubular body 252 (see arrow in FIG. 23) to linearly force the position of attachment element 200 slidingly further toward base 172 of receptacle element 170. In this approach, system 90 and tool 250 can be simplified to remove the need to turn attachment element 200, so no specially shaped tool-engageable end is required on attachment element 200 or the tool. It is emphasized that tool 250 is applicable to the example application of an elongated instrumentation probe 160 described herein, and tool 250 could take a variety of alternative forms depending on the different forms of hardware 150 to be mounted by system 90.

Figure 24:
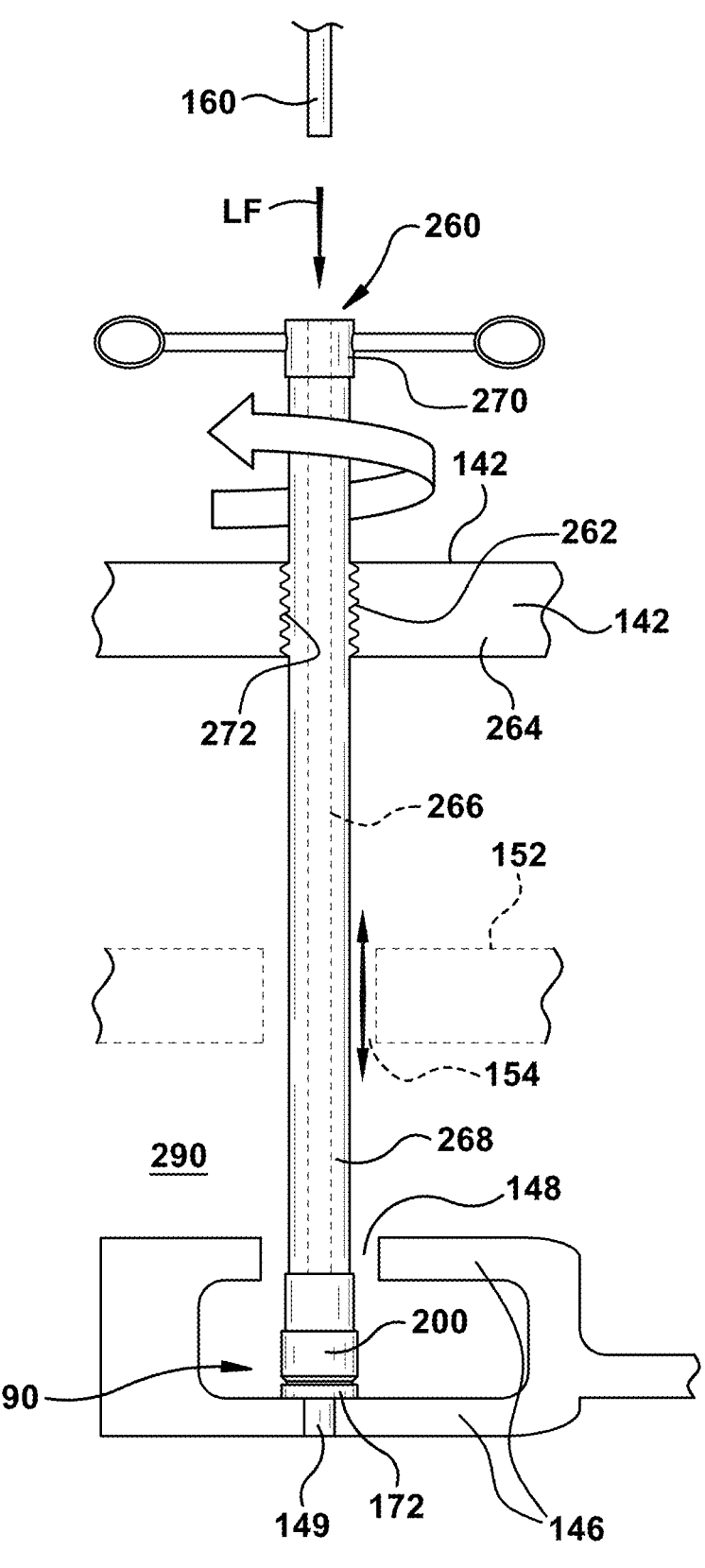
FIG. 24 shows a side view of a tool for a mounting system according to additional embodiments of the disclosure.

FIG. 24 shows a side view of a tool 260 for forcing attachment element 200 relative to receptacle element 170 where they are in a sliding arrangement, according to other embodiments of the disclosure. Tool 260 is similar to tool 250 (FIGS. 22-23) except tool 260 includes a threaded portion 262 configured for threaded advancement relative to a similarly threaded, stationary member 264 that provides a fixed or foundational element for applying force to attachment element 200 of system 90. Tool 260 has a tubular body 266 configured to receive probe 160, i.e., hardware 150, therein. Tool 260 also includes a first portion 268 configured to rotationally and slidingly engage attachment element 200, and a second portion 270 (accessible by a user through outer casing element 142 like tool 230 in FIG. 14) to apply a rotational force to tool 260. With the exception of threaded portion 262, tool 260 otherwise fits through any necessary openings, e.g., 148, 154, to reach system 90 on inner casing element 146. Second portion 270 may include a handle (similar to 240 in FIG. 14) for manual rotation by a user, but second portion 270 could include any form of power tool attachment, e.g., for a power drill, to allow for powered rotation.

In the example shown, stationary member 264 for tool 260 includes outer casing element 142 with an opening 272 therein threaded to mate with threaded portion 262 of tool 260. However, in other embodiments, stationary member 264 could include any form of stationary structure outside or coupled to outer casing element 142. In operation, tool 260 advances (via rotation thereof and the threaded connection between threaded portions (portion 262 of tool 260 and threaded opening 272) against attachment element 200 to advance attachment element 200 relative to receptacle element 170 to overcome force F of disk spring element 220 between attachment element 200 and receptacle element 170, allowing locking element(s) 180 to enter the unlocked position and removal of hardware 150, e.g., probe 160. Similar to tool 250 in FIGS. 22-23, tool 260 is configured to apply a linear force LF to move attachment element 200 onto receptacle element 170. In this approach, no specially shaped tool-engageable end is required between attachment element 200 or the tool. It is emphasized that tool 260 is applicable to the example application of an elongated instrumentation probe 160 described herein, and tool 260 could take a variety of alternative forms depending on the different forms of hardware 150 to be mounted by system 90.

Figure 25:
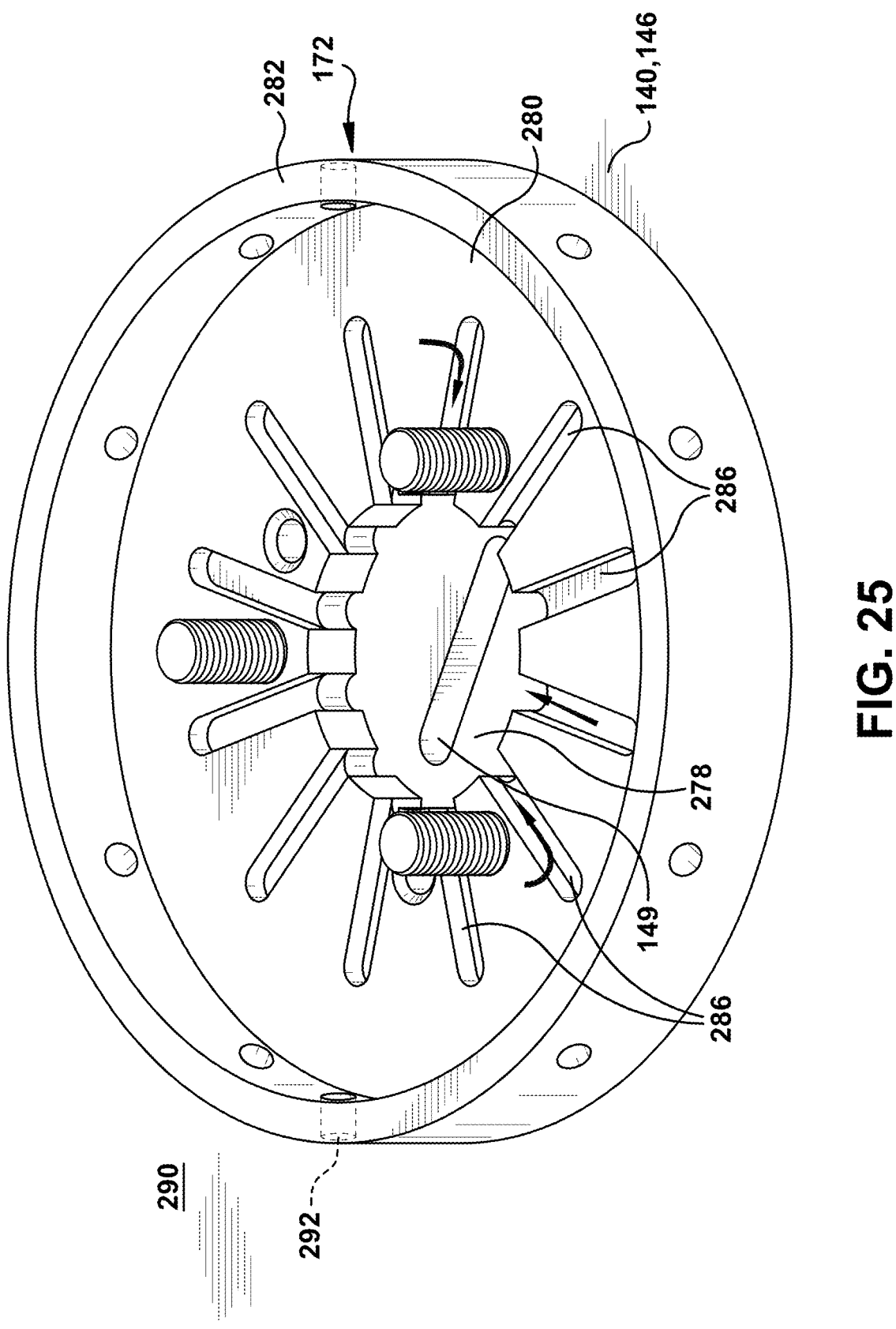
FIG. 25 shows a perspective view of a base of a receptacle element according to alternative embodiments of the disclosure.

Referring again to FIGS. 3 and 4, it will be observed that system 90 encloses a portion 278 of inner casing element 146 around access opening 149. In some cases, as is the situation with GT system 100 (FIG. 1), inner casing element 146 experiences extremely high temperatures that may require cooling where system 90 encloses it, e.g., where probe 160 covers surfaces of base 172. Cooling can be provided in a number of ways. FIG. 25 shows a perspective view of base 172 of receptacle element 170 with collar 174 removed for clarity. (It is noted that collar 174 of FIG. 6 would be coupled to, or formed with, base 172 as shown in FIG. 25.) In certain embodiments, base 172 of receptacle element 170 includes an end portion 280 configured to couple to inner casing element 146, i.e., stationary structure 140. As illustrated in FIGS. 3-4, collar 174 extends from end portion 280. Base 172 may also optionally include an outer wall portion 282 extending concentrically with collar 174 from end portion 280 to define a circular space 284 therebetween configured to rotatably receive (radially inner) end 212 of attachment element 200 therein. As shown in FIG. 25, base 172 also may include a plurality of cooling passages 286 extending radially in end portion 280 and configured to deliver a coolant (arrows) to portion 278 of inner casing element 146, i.e., stationary structure 140, enclosed by receptacle element 170. Cooling passages 286 may also extend axially at a radial inner end thereof; however, this is not necessary in all cases.

Coolant may enter from a high-pressure air chamber 290 within stationary casing 122 (FIG. 2), e.g., surrounding an outer side of inner casing element 146, as is conventionally provided in turbine sections 110 (FIG. 2) of GT systems 100 (FIG. 1). Coolant could also be supplied from some other coolant sources, e.g., in different applications of industrial machines. Coolant may enter cooling passages 286 directly from high pressure air chamber 290, or where outer wall portion 282 is provided, holes 292 may be provided therein to provide a passage for coolant to reach cooling passages 286 in end portion 280. It will be recognized that other cooling passage arrangements are also possible. For example, radially extending cooling holes from an outer periphery of base 172 could extend directly to portion 278 of inner casing element 146, rather than in an axial surface thereof as FIG. 25.

Figure 26:
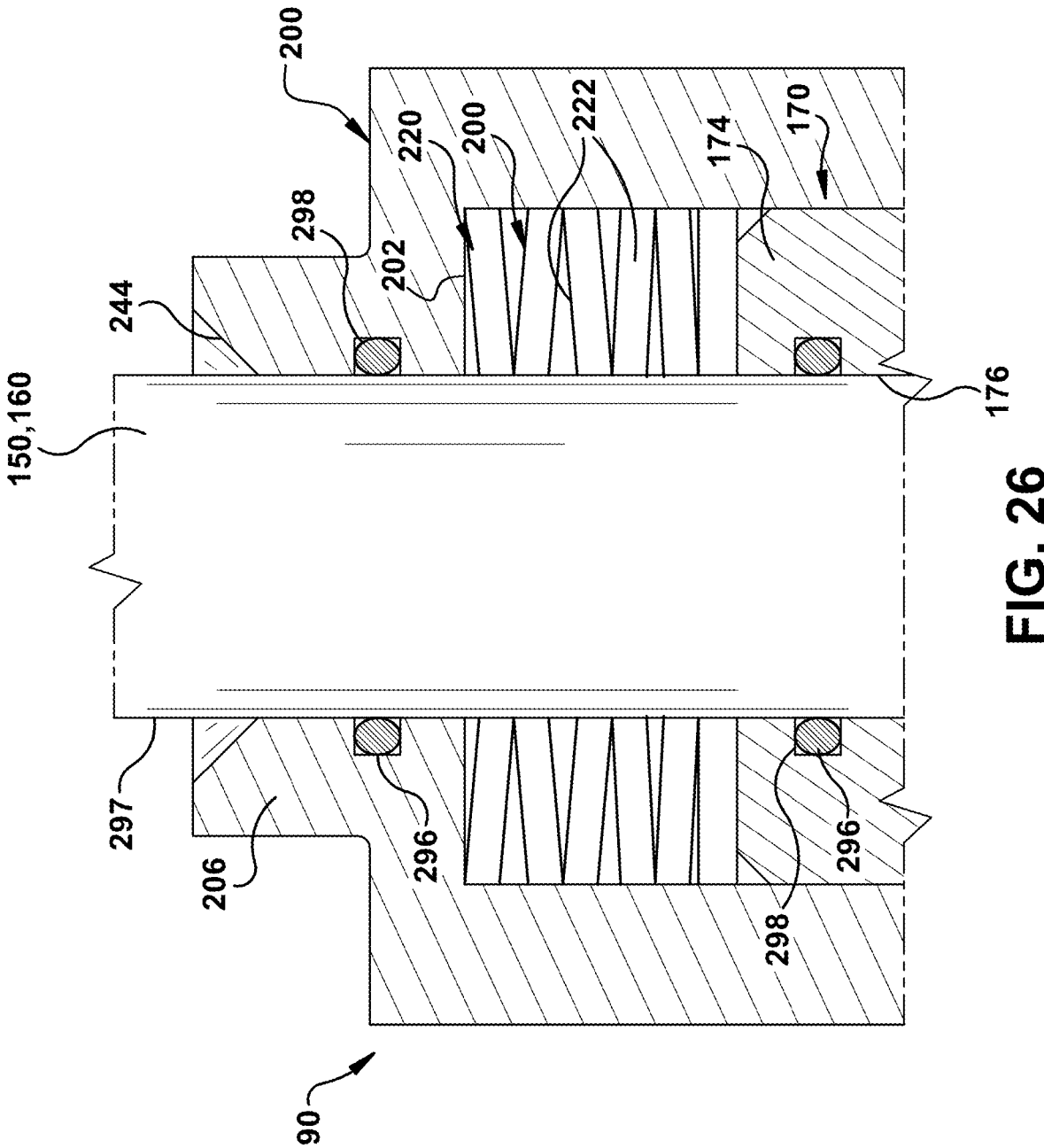
FIG. 26 shows an enlarged cross-sectional view of seal element(s) for a mounting system where an attachment element and a collar of a receptacle element contact hardware, according to embodiments of the disclosure.

FIG. 26 shows an enlarged cross-sectional view of system 90 where attachment element 200 and collar 174 of receptacle element 170 contact probe 160, i.e., hardware 150. In certain applications, sealing of hardware 150 in system 90 may be desired. In this case, a sealing element 296 may be provided for sealing between probe 160, i.e., hardware 150, and at least one of attachment element 200 and receptacle element 170. In FIG. 26, sealing elements 196 are shown for both attachment element 200 and receptacle element 170, but this is not necessary in all cases. Sealing element 196 can take any now known or later developed form appropriate for sealing against hardware 150. In the example shown, probe 160 has a smooth outer surface 297, so elastomeric O-rings may be used, where temperatures allow. Any form of seat 298 can be formed in probe 160, attachment element 200 and/or receptacle element 170 to accommodate the sealing element used. It will be recognized that a wide variety of other forms of sealing elements may be used.

The parts of system 90 may be made of any material having the appropriate characteristics, e.g., strength, wear resistance, heat resistance, etc., for the application in which used. For a GT system 100 (FIG. 1) application, certain parts of system 90 exposed to high temperatures may be made of high-temperature materials (e.g., resistant up to 648° C. (1200° F.)), such as but not limited to Inconel® alloys (nickel-chromium-based superaoys known for their oxidation- and corrosion-resistance and their ability to form a protective oxide layer) or other high temperature metals or metal alloys. While each part of system 90 has been shown as one piece, it will be recognized that one or more parts may be segmented, e.g., for assembly purposes. For example, attachment element 200 may include two parts fixed together, e.g., by welds, fasteners, etc. In another example, receptacle element 170 may be two parts that are coupled together, e.g., coupling parts as shown in FIGS. 6 and 25.

For those embodiments that require rotation, arrows have been provided to illustrate the rotational action. It is emphasized that the direction of rotation may vary depending on the direction of threading used. Accordingly, the direction of the arrows should not be considered limiting.

Figure 27:
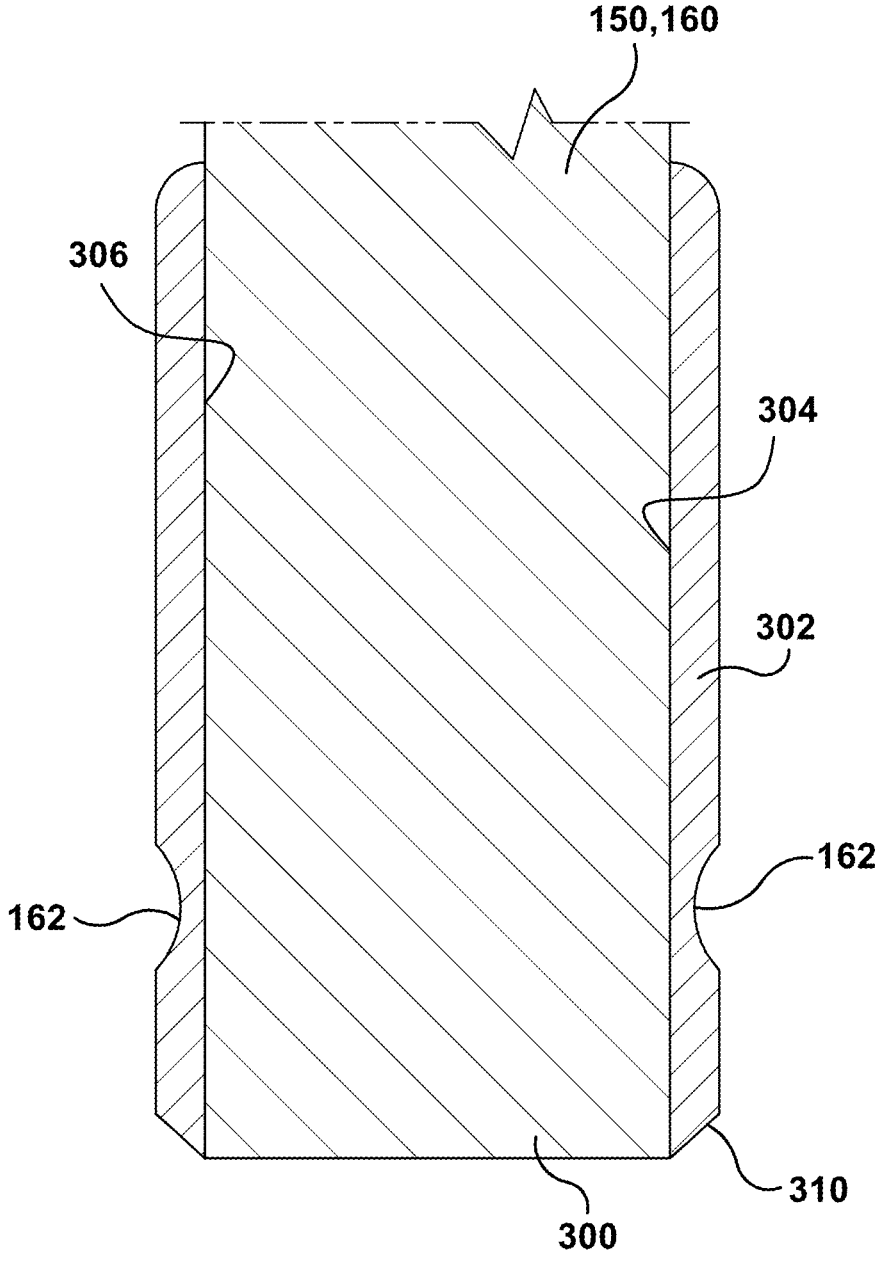
FIG. 27 shows a cross-sectional view of hardware with an end including an end fitting including retainer element(s) for a mounting system, according to embodiments of the disclosure.

It will be recognized that system 90 requires probe 160, or other forms of hardware 150, to include retainer element (s) 162 to function as described herein. That is, probe 160 includes retainer element(s) 162 in at least an outer surface thereof. New probes 160 can be readily manufactured with retainer element(s) 162 thereon. FIG. 27 shows a cross-sectional view of an end 300 of probe 160 that does not include retainer element(s) 162 but instead includes an end fitting 302 defining retainer element(s) 162. End fitting 302 can take any form configured to be fixedly coupled to end 300 of probe 160, e.g., with an internal opening 304 configured to closely mate with an outer surface 306 of probe 160. In this manner, end fitting 302 allows retrofitting of probes 160, e.g., older or used probes, for use with system 90 so probe 160 includes retainer element(s) 162 in at least an outer surface thereof. End fitting 302 can be fixedly coupled to probe 160 in any manner, e.g., laser welding, pinned, crimped, compression fit, etc. End fitting 302 may include end 310 having any shape, size and/or other configuration desired for easy entry into and secured positioning in system 90, such as into attachment element 200, internal opening 176 of receptacle element 170 and/or seating in base 172 of receptacle element 170. End fitting 302 can be made of any material configured for fixed coupling to probe 160, compatible with the environmental setting in which employed, and capable of a wear resistance for which probe 160 will experience through any repeated removal/installation in system 90.

Embodiments of the disclosure provide various technical and commercial advantages, examples of which are discussed herein. The system allows mounting of the hardware confidently knowing it is mounted securely and at the proper location and prevents later loosening or movement of the hardware using the anti-rotation function described herein. Further, the system prevents any relative movement between the receptacle element and hardware during operation (i.e., there is no play), which, in the case of instrumentation probes, prevents inaccurate measurements from movement of the probe. The system also can be employed in challenging or tight-space positions or where line-of-sight to the mounting position is impossible (e.g., a double-wall or a triple-wall casing application in a gas turbine system). The system can also be used in adverse environmental situations, such as high temperatures. While described herein relative to a probe for a casing element of a turbine section of a gas turbine system, the mounting system has a wide range of potential applications for all sorts of hardware other than probes, e.g., plugs and other hardware, mounted to any form of stationary structure.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of the technology and to enable others of ordinary skill in the art to understand the disclosure for contemplating various modifications to the present embodiments, which may be suited to the particular use contemplated.

What is claimed is:

1. A system for removably mounting a hardware to a stationary structure, the system comprising:
   a receptacle element including a base configured to be fixed to the stationary structure and a collar extending from the base, the collar including an internal opening configured to slidingly receive the hardware and a locking element aperture in the collar open to the internal opening;
   a locking element movable in the locking element aperture between:
      a locked position extending partially into the internal opening to fixedly engage the hardware; and
      an unlocked position retracted from the internal opening and allowing the hardware to be removed from the internal opening;
   an attachment element axially movable relative to the receptacle element, the attachment element having a central opening defined therein through which the hardware extends and a tapered portion configured to move the locking element into the locked position based on a position of the attachment element relative to the receptacle element; and
   a disk spring element between the attachment element and the receptacle element, the disk spring element configured to force the attachment element relative to the receptacle element toward a position of the attachment element corresponding with the locked position of the locking element.

2. The system of claim 1, wherein the receptacle element includes a plurality of locking element apertures including the locking element aperture; and wherein the locking element is one of a plurality of locking elements, and one of the locking elements is in each of the plurality of locking element apertures in the locked position.

3. The system of claim 1, wherein the locking element includes a sphere.

4. The system of claim 1, wherein the disk spring element includes a plurality of stacked disk springs.

5. The system of claim 1, wherein the attachment element and the receptacle element are threadedly coupled, wherein threaded advancement of the attachment element relative to the receptacle element overcomes a force of the disk spring element between the attachment element and the receptacle element, allowing the locking element to enter the unlocked position and the hardware to be removed.

6. The system of claim 5, further comprising a tool having a tubular body configured to receive the hardware therein, a first portion configured to non-rotatably engage the attachment element, and a second portion configured for rotating the tubular body to rotatably adjust the position of the attachment element relative to the receptacle element using the threaded coupling therebetween.

7. The system of claim 1, wherein the attachment element and the receptacle element are slidingly coupled, wherein forced advancement of the attachment element relative to the receptacle element overcomes a force of the disk spring element between the attachment element and the receptacle element, allowing the locking element to enter the unlocked position and the hardware to be removed.

8. The system of claim 7, further comprising a tool having a tubular body configured to receive the hardware therein, a first portion configured to engage the attachment element, and a second portion accessible by a user to apply a force to slidingly advance the attachment element relative to the receptacle element to overcome a force of the disk spring element between the attachment element and the receptacle element, allowing the locking element to enter the unlocked position and the hardware to be removed.

9. The system of claim 1, wherein the base of the receptacle element further includes:

an end portion configured to couple to the stationary structure and from which the collar extends;

an outer wall portion extending concentrically with the collar from the end portion to define a circular space therebetween configured to rotatably receive an end of the attachment element therein; and a plurality of cooling passages extending radially in the end portion and configured to deliver a coolant to a portion of the stationary structure enclosed by the receptacle element.

10. The system of claim 1, wherein the locking element aperture includes a retention member preventing the locking element from fully entering the internal opening in the collar of the receptacle element.

11. The system of claim 1, further comprising a sealing element for sealing between the hardware and at least one of the attachment element and the receptacle element.

12. The system of claim 1, wherein the hardware includes a probe, and the stationary structure includes a casing element of a turbine section of a gas turbine system.

13. The system of claim 1, wherein the hardware includes an end having an end fitting coupled thereto, the end fitting including a retainer element configured to be engaged by the locking element.

14. A system for removably mounting a probe to a casing element of a turbine section of a gas turbine system, the system comprising:

a receptacle element including a base configured to be fixed to the casing element and a collar extending from the base, the collar including an internal opening configured to slidingly receive the probe and a locking element aperture in the collar open to the internal opening;

a locking element movable in the locking element aperture between:

a locked position extending partially into the internal opening to fixedly engage the probe; and an unlocked position retracted from the internal opening and allowing the probe to be removed from the internal opening;

an attachment element axially movable relative to the receptacle element, the attachment element having a central opening defined therein through which the probe extends and a tapered portion configured to move the locking element into the locked position based on a position of the attachment element relative to the receptacle element; and a disk spring element between the attachment element and the receptacle element, the disk spring element configured to force the attachment element relative to the receptacle element toward a position of the attachment element corresponding with the locked position of the locking element, wherein the locking element aperture includes a retention member preventing the locking element from fully entering the internal opening in the collar of the receptacle element.

15. The system of claim 14, wherein the receptacle element includes a plurality of locking element apertures including the locking element aperture; and wherein the locking element is one of a plurality of locking elements, and one of the locking elements is in each of the plurality of locking element apertures in the locked position.

16. The system of claim 14, wherein the locking element includes a sphere.

17. The system of claim 14, wherein the disk spring element includes a plurality of stacked disk springs.

18. The system of claim 14, wherein the attachment element and the receptacle element are threadedly coupled, wherein threaded advancement of the attachment element relative to the receptacle element overcomes a force of the disk spring element between the attachment element and the receptacle element, allowing the locking element to enter the unlocked position and the probe to be removed.

19. The system of claim 18, further comprising a tool having a tubular body configured to receive the probe therein, a first portion configured to non-rotatably engage the attachment element, and a second portion configured for rotating the tubular body to rotatably adjust the position of the attachment element relative to the receptacle element using the threaded coupling therebetween.

20. The system of claim 14, wherein the attachment element and the receptacle element are slidingly coupled, wherein forced advancement of the attachment element relative to the receptacle element overcomes a force of the disk spring element between the attachment element and the receptacle element, allowing the locking element to enter the unlocked position and the probe to be removed.

21. The system of claim 20, further comprising a tool having a tubular body configured to receive the probe therein, a first portion configured to engage the attachment element, and a second portion accessible by a user to apply a force to slidingly advance the attachment element relative to the receptacle element to overcome a force of the disk spring element between the attachment element and the receptacle element, allowing the locking element to enter the unlocked position and the probe to be removed.

22. The system of claim 14, wherein the base of the receptacle element further includes:

an end portion configured to couple to the casing element and from which the collar extends;

an outer wall portion extending concentrically with the collar from the end portion to define a circular space therebetween configured to rotatably receive an end of the attachment element therein; and a plurality of cooling passages extending radially in the end portion and configured to deliver a coolant to a portion of the casing element enclosed by the receptacle element.

23. The system of claim 14, further comprising a sealing element for sealing between the probe and at least one of the attachment element and the receptacle element.

24. The system of claim 14, wherein the probe includes an end having an end fitting coupled thereto, the end fitting including a retainer element configured to be engaged by the locking element.

25. A gas turbine (GT) system, comprising:

a compressor section;

a combustion section operatively coupled to the compressor section;

a turbine section operatively coupled to the combustion section and including an outer casing element including a first opening, and an inner casing element inward of the outer casing element, the inner casing element surrounding rotatable turbine blades and including a second opening; and a probe positioned through the first opening and operatively mounted relative the second opening in the inner casing element by a mounting system, the probe including a retainer element in at least an outer surface thereof, the mounting system including:

a receptacle element including a base configured to be fixed to the inner casing element and a collar extending from the base, the collar including an internal opening configured to slidingly receive the probe and a locking element aperture in the collar open to the internal opening;

a locking element movable in the locking element aperture between a locked position extending partially into the internal opening to fixedly engage the retainer element of the probe and an unlocked position retracted from the internal opening and allowing the probe to be removed from the internal opening;

an attachment element axially movable relative to the receptacle element, the attachment element having a central opening defined therein through which the probe extends and a tapered portion configured to move the locking element into the locked position based on a position of the attachment element relative to the receptacle element; and a disk spring element between the attachment element and the receptacle element, the disk spring element configured to force the attachment element relative to the receptacle element toward a position of the attachment element corresponding with the locked position of the locking element.

26. A system for removably mounting a probe to a casing element of a turbine section of a gas turbine system, the system comprising:

a receptacle element including a base configured to be fixed to an innermost casing element of the turbine section and a collar extending from the base, the collar including an internal opening configured to slidingly receive the probe and a locking element aperture in the collar open to the internal opening;

a locking element movable in the locking element aperture;

an attachment element threadedly coupled to the receptacle element, the attachment element having a central opening defined therein through which the probe extends and a tapered portion configured to move the locking element relative to the locking element aperture based on a position of the attachment element relative to the receptacle element; and a disk spring element between the attachment element and the receptacle element, the disk spring element forcing the attachment element toward a position of the attachment element corresponding with a locked position of the locking element relative to the receptacle element;

wherein, in the locked position, the tapered portion of the attachment element engages the locking element to extend the locking element partially into the internal opening to lockingly engage a retainer element on the probe and prevent removal of the probe from the receptacle element, and rotation of the attachment element is resisted relative to the receptacle element by a force from the disk spring element between the attachment element and the receptacle element; and wherein, in an unlocked position of the locking element with the probe, the attachment element is threaded further onto the receptacle element against the force from the disk spring element, moving the tapered portion of the attachment element out of engagement with the locking element and allowing the probe to move the locking element out of the internal opening as the probe is removed from the internal opening of the receptacle element.

27. The system of claim 26, wherein the probe includes an end having an end fitting coupled thereto, the end fitting including the retainer element.

\* \* \* \* \*